(12) United States Patent
Wang et al.

(10) Patent No.: US 10,306,253 B2
(45) Date of Patent: May 28, 2019

(54) SIGNALING OF PARAMETER SETS IN FILES OF MULTI-LAYER BITSTREAMS

(71) Applicant: QUALCOMM Incorporated, San Diego, CA (US)

(72) Inventors: Ye-Kui Wang, San Diego, CA (US); Fnu Hendry, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 15/274,544

(22) Filed: Sep. 23, 2016

(65) Prior Publication Data

US 2017/0111649 A1 Apr. 20, 2017

Related U.S. Application Data

(60) Provisional application No. 62/241,683, filed on Oct. 14, 2015.

(51) Int. Cl.
| | |
|---|---|
| *H04N 19/46* | (2014.01) |
| *H04N 19/30* | (2014.01) |
| *H04N 19/187* | (2014.01) |
| *H04N 19/177* | (2014.01) |
| *H04N 19/70* | (2014.01) |

(Continued)

(52) U.S. Cl.
CPC ........... *H04N 19/46* (2014.11); *H04N 19/177* (2014.11); *H04N 19/187* (2014.11); *H04N 19/188* (2014.11); *H04N 19/30* (2014.11); *H04N 19/50* (2014.11); *H04N 19/70* (2014.11); *H04N 21/85406* (2013.01)

(58) Field of Classification Search
CPC ................. H04N 19/46; H04N 19/188; H04N 21/85406; H04N 19/50; H04N 19/30; H04N 19/70; H04N 19/187; H04N 19/177

See application file for complete search history.

(56) References Cited

U.S. PATENT DOCUMENTS

2014/0193139 A1* 7/2014 Wang .................. H04N 19/597
386/328
2014/0301485 A1* 10/2014 Ramasubramonian ......................
H04N 19/895
375/240.27

(Continued)

OTHER PUBLICATIONS

Invitation to Pay Additional Fees and Partial International Search Report for PCT Application No. PCT/US2016/053758, dated Nov. 30, 2016, 10 pp.

(Continued)

*Primary Examiner* — Tat C Chio
(74) *Attorney, Agent, or Firm* — Shumaker & Sieffert, P.A.

(57) ABSTRACT

A device generates, stores, or obtains a file that complies with a restriction specified in a file format to which the file conforms. The restriction requires that for each respective Intra Random Access Point (IRAP) picture, a parameter set required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the respective IRAP picture's sample, or a temporally collocated sample of the respective IRAP picture's sample in a track of that carries the reference layer.

54 Claims, 10 Drawing Sheets

(51) Int. Cl.
*H04N 19/50* (2014.01)
*H04N 21/854* (2011.01)
*H04N 19/169* (2014.01)

(56) References Cited

U.S. PATENT DOCUMENTS

2015/0110192 A1 4/2015 Wang et al.
2015/0110203 A1 4/2015 Wang et al.

OTHER PUBLICATIONS

"Text of ISO/IEC DIS 14496-15 4th edition," 112, MPEG Meeting; Jun. 22, 2015-Jun. 26, 2015; Warsaw; (Motion Picture Expert Group or ISO/IEC JTC1/SC29/WG11),, No. N15479, Aug. 26, 2015 (Aug. 26, 2015), XP030022193, 186 pages.

Wang, et al.,"On Parameter Set Signalling in L-HEVC File Format," MPEG Meeting; Oct. 19-23, 2015; Geneva; Notion Picture Expert Group or ISO/IEC JTC1/SC29/WG11),, No. m37228, Oct. 15, 2015, 3 pp.

"International Standard ISO/IEC 23008-2, Information Technology-High efficiency coding and media delivery in heterogeneous environments—Part 2 High Efficiency video coding", First Edition, Dec. 1, 2013, 312 pp.

ITU-T H.264, Series H: Audiovisual and Multimedia Systems Infrastructure of audiovisual services—Coding of moving video, Advanced video coding for generic audiovisual services, The International Telecommunication Union, Mar. 2005, 343 pp.

ITU-T H.265, Series H: Audiovisual and Multimedia Systems, Infrastructure of audiovisual services—Coding of moving video, Advanced video coding for generic audiovisual services, The International Telecommunication Union, Apr. 2015, 634 pp.

"International Standard ISO/IEC 14496-12, Information Technology-Coding of audio-visual objects—Part 12 ISO base media file format", Third Edition, Oct. 15, 2008, 120 pp.

"International Standard ISO/IEC 14496-15, Information Technology-Coding of audio-visual objects—Part 15 Carriage of network abstraction layer (NAL) unit structured video in ISO base media file format", Third Edition, Jul. 1, 2014, 124 pp.

3GPP TS 26.244 V12.2.0, 3rd Generation Partnership Project; Technical Specification Group Services and System Aspects; Transparent end-to-end packet switched streaming service (PSS); 3GPP file format (3GP), (Release 12), Dec. 2013, 61 pp.

International Search Report and Written Opinion—PCT/US2016/053758—ISA/EPO—dated Mar. 15, 2017.

Response to Written Opinion dated Mar. 15, 2017 from International Application No. PCT/US2016/053758, filed on Jun. 5, 2017, 7 pp.

International Preliminary Report on Patentability from International Application No. PCT/US2016/053758, dated Jun. 26, 2017, 9 pp.

* cited by examiner

SIGNALING OF PARAMETER SETS IN FILES OF MULTI-LAYER BITSTREAMS

This application claims the benefit of U.S. Provisional Patent Application 62/241,683, filed Oct. 14, 2015, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

HEVC provides for parameter sets, such as Video Parameter Sets (VPSs), Sequence Parameter Sets (SPSs), and Picture Parameter Sets (PPSs). Such parameter sets include parameters that are applicable to one or more encoded pictures. For instance, parameters in an SPS may be applicable to an entire sequence of encoded pictures. A video decoder may need to be able to access the parameter sets applicable to an encoded picture to decode the encoded picture. In an HEVC bitstream, parameter sets are contained in Network Abstraction Layer (NAL) units separate from NAL units contained encoded slice segments of encoded pictures. Thus, the NAL units containing encoded slice segments of an encoded picture may be in a separate part of the bitstream from the NAL units containing the parameter sets needed for decoding the encoded picture.

In the context of video coding, random access refers to a decoding of a bitstream starting from a coded picture that is not the first coded picture in the bitstream. An HEVC bitstream includes Intra Random Access Pictures (IRAP) pictures to facilitate random access. Like other types of pictures, a video decoder may need to access the parameter sets applicable to IRAP pictures to decode the IRAP pictures.

A file format for storage of multi-layer HEVC bitstreams (i.e., L-HEVC bitstreams) is under development. In the file format, each track of the file may include a series of samples. Each sample of a track may include temporally collocated encoded pictures of one or more different layers. A device that stores a file containing an L-HEVC bitstream may extract all of the L-HEVC bitstream or portions of the L-HEVC bitstream and provided the extracted data, directly or indirectly, to a video decoder. To facilitate random access, the device may extract portions of the L-HEVC bitstream starting from a sample of the file containing an IRAP picture. Thus, while the device may be able to provide encoded video data of the IRAP picture to the video decoder, if the device is unable to provide the parameter sets needed for decoding the IRAP picture to the video decoder, the video decoder may be unable to decode the IRAP picture. Previous proposals for the file format do not adequately enable the device to ensure the parameter sets needed for decoding an IRAP picture are provided to the video decoder, especially in instances where the device is not configured to parse the L-HEVC bitstream itself. Adding the ability to parse the L-HEVC bitstream may add significant complexity to the device and slow operation of the device. Furthermore, such previous proposals may lead to unnecessarily large file sizes.

SUMMARY

A device generates, stores, or obtains a file that complies with a restriction specified in a file format to which the file conforms. The restriction requires that for each respective Intra Random Access Point (IRAP) picture, a parameter set required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the respective IRAP picture's sample, or a temporally collocated sample of the respective IRAP picture's sample in a track that carries the reference layer.

In one example of this disclosure, a method of processing video data, the method comprising: obtaining a multi-layer bitstream comprising a plurality of parameter sets, encoded representations of a plurality of IRAP pictures of the video data, and encoded representations of a plurality of non-IRAP pictures of the video data; and generating a file for storage of the multi-layer bitstream such that the file complies with a restriction specified in a file format to which the file conforms, wherein: for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer.

In another example, this disclosure describes a device for processing video data, the device comprising: one or more processing circuits configured to generate a file for storage of a multi-layer bitstream such that the file complies with a restriction specified in a file format to which the file conforms, wherein: the multi-layer bitstream comprises a plurality of parameter sets, encoded representations of a plurality of IRAP pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer; and a data storage medium configured to store the file.

In another example, this disclosure describes a method of processing video data, the method comprising: storing a file that stores a multi-layer bitstream, the file complying with a restriction specified in a file format to which the file conforms, wherein: the multi-layer bitstream comprises a plurality of parameter sets, encoded representations of a plurality of IRAP pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer; and streaming at least a portion of the file to a receiving device.

In another example, this disclosure describes a device for processing video data, the device comprising: a data storage medium configured to store a file that stores a multi-layer bitstream, the file complying with a restriction specified in a file format to which the file conforms, wherein: the multi-layer bitstream comprises a plurality of parameter sets, encoded representations of a plurality of IRAP pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer; and an interface configured to stream at least a portion of the file to a receiving device.

In another example, this disclosure describes a method of processing video data, the method comprising: obtaining a file storing a multi-layer bitstream, the file complying with a restriction specified in a file format to which the file conforms, wherein: the multi-layer bitstream comprises a plurality of parameter sets, encoded representations of a plurality of IRAP pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer; and decoding at least a portion of the multi-layer bitstream in the file.

In another example, this disclosure describes a device for processing video data, the method comprising: an input interface configured to obtain a file storing a multi-layer bitstream, the file complying with a restriction specified in a file format to which the file conforms, wherein: the multi-layer bitstream comprises a plurality of parameter sets, encoded representations of a plurality of IRAP pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer; and one or more processing circuits coupled to the input interface, the one or more processing circuits configured to decode at least a portion of the multi-layer bitstream in the file.

In another example, this disclosure describes a device for processing video data, the device comprising: means for obtaining a multi-layer bitstream comprising a plurality of parameter sets, encoded representations of a plurality of IRAP pictures of the video data, and encoded representations of a plurality of non-IRAP pictures of the video data; and means for generating a file for storage of the multi-layer bitstream such that the file complies with a restriction specified in a file format to which the file conforms, wherein: for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer.

In another example, this disclosure describes a computer-readable storage medium comprising instructions that, when executed, cause a device to: obtain a multi-layer bitstream comprising a plurality of parameter sets, encoded representations of a plurality of IRAP pictures of the video data, and encoded representations of a plurality of non-IRAP pictures of the video data; and generate a file for storage of the multi-layer bitstream such that the file complies with a restriction specified in a file format to which the file conforms, wherein: for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer.

In another example, this disclosure describes a device for processing video data, the device comprising: means for storing a file that stores a multi-layer bitstream, the file complying with a restriction specified in a file format to which the file conforms, wherein: the multi-layer bitstream comprises a plurality of parameter sets, encoded representations of a plurality of IRAP pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer; and means for streaming at least a portion the file to a receiving device.

In another example, this disclosure describes a computer-readable storage medium configured to store instructions that, when executed, cause a device to: store a file that stores a multi-layer bitstream, the file complying with a restriction specified in a file format to which the file conforms, wherein: the multi-layer bitstream comprises a plurality of parameter sets, encoded representations of a plurality of IRAP pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer; and stream at least a portion of the file to a receiving device.

In another example, this disclosure describes a device for processing video data, the device comprising: means for obtaining a file storing a multi-layer bitstream, the file complying with a restriction specified in a file format to which the file conforms, wherein: the multi-layer bitstream comprises a plurality of parameter sets, encoded representations of a plurality of IRAP pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer; and means for decoding at least a portion of the multi-layer bitstream in the file.

In another example, this disclosure describes a computer-readable storage medium having stored thereon instruction that, when executed, cause a device to: obtain a file storing a multi-layer bitstream, the file complying with a restriction specified in a file format to which the file conforms, wherein: the multi-layer bitstream comprises a plurality of parameter sets, encoded representations of a plurality of IRAP pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures: the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following: a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer; and decode at least a portion of the multi-layer bitstream in the file.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
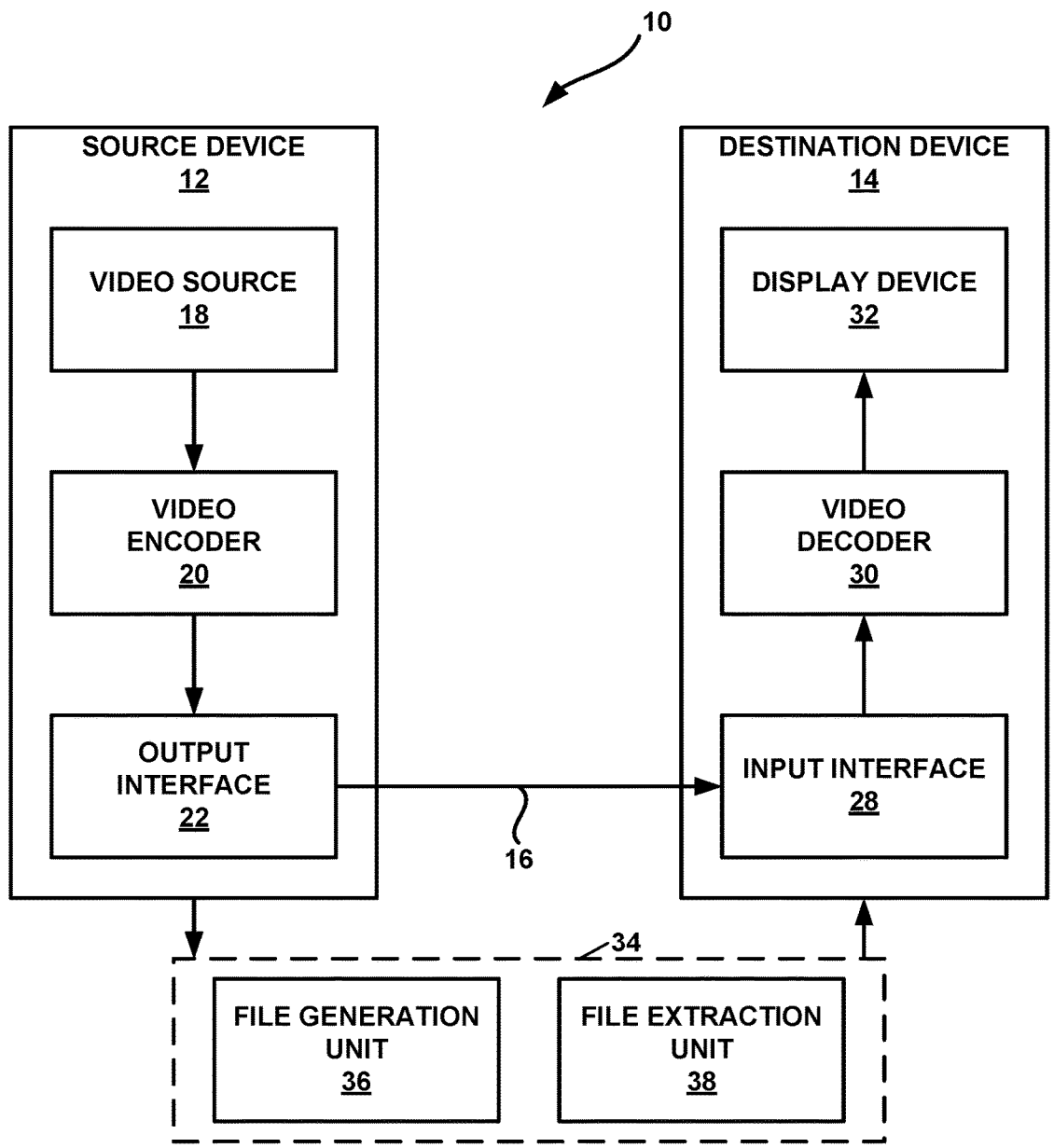
FIG. 1 is a block diagram illustrating an example video coding system that may utilize the techniques described in this disclosure.

This disclosure relates to storage of video contents in ISO (International Organization for Standardization) base media file formats and file formats derived therefrom. More specifically, this disclosure describes techniques for signaling of parameter sets in files of multi-layer bitstreams, particularly when multiple tracks are used for storage of a multi-layer bitstream.

For example, a file format based on the ISO base media file format is being developed for carriage of multi-layer bitstreams of encoded video data, such as Layered High Efficiency Video Coding (L-HEVC) bitstreams. A multi-layer bitstream comprises multiple layers. Each layer comprises a sequence of encoded pictures occurring at different output times. In the case of scalable video coding, the layers of a multi-layer bitstream may include a base layer and one or more enhancement layers. The base layer is decodable without reference to any of the enhancement layers. The enhancement layers may spatially or temporally enhance the pictures of the base layer. For instance, an enhancement layer may have a higher frame rate than the base layer. Thus, an enhancement layer may include an encoded picture for an output time and the base layer does not include an encoded picture for that output time. In the case where a first layer of a multi-layer bitstream includes an encoded picture at an output time and a second layer of the multi-layer bitstream does not include an encoded picture for the output time, the encoded picture in the first layer is said to be unaligned with an encoded picture in the second layer. In multi-view video coding, the layers of a multi-layer bitstream may correspond to encoded pictures in different views.

A file conforming to the file format comprises a set of data structures referred to as "boxes." The boxes of a file may include media data boxes, each of which includes one or more samples. A sample may include one or more encoded pictures that are in the same access unit (i.e., that have the same output time). For instance, a sample may include encoded pictures that have the same output time, but are in different layers. Furthermore, in the ISO base media file format and extensions thereof, the term "sample" applies to a media access unit, such as a video access unit or an audio access unit. However, at the codec level, the term "sample" may apply to a value of a color component of a pixel. Thus, references to "samples" in this disclosure should be understood to refer to samples at the file format level (that is, those including one or more encoded pictures of the same access unit), unless otherwise indicated explicitly or as would be understood from the context of the discussion.

Additionally, the boxes of a file may include one or more track boxes that contain metadata for a track of the file. For instance, a track box may include a sample table box. The metadata for a track includes one or more sample description entries. Each sample is associated with one of the sample description entries of a track. Because individual samples of a track may include encoded pictures belonging to multiple layers and the encoded pictures of these layers may be unaligned, different samples of the track may include different numbers of encoded pictures.

Various codecs allow bitstreams to include various types of parameter sets that are separate from encoded pictures, but contain parameters required for decoding the encoded pictures. For instance, HEVC defines video parameter sets (VPSs), sequence parameter sets (SPSs), and picture parameter sets (PPSs). In particular situations, it may be desirable to have the parameter sets be available to a device at the file level, as opposed to requiring the device to be able to interpret the parameter sets at a bitstream-level. For instance, it may be desirable for the parameter sets to be included in the metadata of a file, in addition to being encoded in a video data bitstream encoded according to a codec, such as L-HEVC. For example, being able to interpret the parameter sets at the file level may enable a device to determine whether a decoder is capable of decoding particular encoded pictures stored in the file. Additionally, in some examples, having parameter sets in the metadata of the file may assist with random access by enabling a device processing the file to provide the parameter sets to a video decoder.

Accordingly, restrictions have previously been proposed that require files to conform to a requirement that if a sample contains at least one Intra Random Access Point (IRAP) picture as defined in HEVC (i.e., ISO/IEC 23008-2), each parameter set needed for decoding the IRAP pictures and the following pictures in decoding order in each layer that contains an IRAP picture in the sample shall be included either in the sample entries of the tracks carrying layers present in this sample or in that sample itself (possibly by using extractors). Furthermore, it has been proposed, that otherwise (i.e., the sample contains no IRAP picture), each parameter set needed for decoding that sample shall be included either in the sample entries of the tracks carrying layers present in this sample or in any of the samples following the previous sample containing at least one IRAP picture to that sample itself (possibly by using extractors), inclusive. An extractor is a reference to another portion of a file.

However, there may be certain issues regarding the restrictions described above. For example, the proposed restrictions are unclear and disallow potentially desirable scenarios. The techniques described in this disclosure may address the issues regarding the restrictions described above. For example, instead of the restrictions specified above, a file may comply with the following restrictions. In this example, for each respective track of a plurality of tracks in the file, media content for the respective track comprises a respective sequence of samples. For each respective IRAP picture of the plurality of IRAP pictures, the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track. In other examples, the restriction may be applicable when a sample entry name of the relevant sample entry has another value. In this example, the restriction requires that each parameter set of the plurality of parameter sets that is required for decoding the respective IRAP picture is in at least one of the following:
 a sample entry of the respective IRAP picture's track that is applicable to the respective IRAP picture's sample,
 a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample,
 the respective IRAP picture's sample, and any temporally collocated sample of the respective IRAP picture's sample in a track of the plurality of tracks that carries a reference layer of the respective IRAP picture's layer.

Implementing these restrictions may enhance the functionality of computing devices that use files that comply with the restrictions by potentially reducing the size of the files, which may conserve storage space and processing resources of such computing devices. For instance, as previously described, if a file is required to include parameter sets needed for decoding each IRAP picture in the sample containing the IRAP picture or the sample entry applicable to the sample containing the IRAP picture, the file may end up with unneeded copies of the parameter sets needed for decoding the IRAP picture. This is at least because, in multi-layer HEVC, a VPS needed for decoding an encoded picture may be applicable to pictures in multiple layers, two or more of which may be in a plurality of different tracks of the file. In contrast to the previously proposed restrictions, the restrictions proposed in this disclosure do not require copies of this VPS to be present in sample entries of each of the plurality of tracks or in the samples containing the pictures to which the VPS is applicable. Rather, in files complying with the restriction of this disclosure, the VPS may be present in samples or sample entries of less than all of the tracks, thereby potentially reducing the number of copies of the VPS in the file.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC).

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media. Examples of data storage media include, short term memory, Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. For example, input interface 28 may obtain a file storing a bitstream, such as a multi-layer bitstream. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video compression standard, such as HEVC standard mentioned above, and described in the HEVC standard. In addition to the base HEVC standard, there are ongoing efforts to produce scalable video coding, multiview video coding, and 3D coding extensions for HEVC. In some examples, the techniques described in this disclosure may be applied to encoders and decoders configured to operate according to other video coding standards.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan. A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units or blocks may include CTUs, CUs, PUs, transform units (TUs), macroblocks, macroblock partitions, and so on. In some contexts, discussion of PUs may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive blocks (e.g., predictive luma, Cb and Cr blocks) for one or more PUs of a CU, video encoder 20 may generate residual blocks for the CU. Each sample in a residual block of the CU may indicate a difference between a sample in a predictive block of a PU of the CU and a corresponding sample in a coding block of the CU. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a transform block to generate a coefficient block for a TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream. The bitstream may also include syntax elements that are not entropy encoded.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may obtain syntax elements from the bitstream. For example, video decoder 30 may parse the bitstream to decode syntax elements from the bitstream. Video decoder 30 may reconstruct the pictures of the video data based at least in part on the syntax elements obtained (e.g., decoded) from the bitstream. The process to reconstruct the video data may be generally reciprocal to the process performed by video encoder 20. For instance, video decoder 30 may use motion vectors of PUs to determine predictive sample blocks (i.e., predictive blocks) for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In HEVC, each NAL unit includes a syntax element (e.g., nal_unit_type) that indicates a NAL unit type of the NAL unit. Furthermore, in HEVC, video decoder 30 may identify, based on the NAL unit type of a NAL unit, the NAL unit as being associated with one of a plurality of picture types. These picture types may include Instantaneous Decoding Refresh (IDR) pictures, Clean Random Access (CRA) pictures, Temporal Sub-Layer Access (TSA) pictures, Broken Link Access (BLA) pictures and coded pictures that are not IDR, CRA, or TSA pictures.

HEVC and other video coding standards provide mechanisms for enabling random access into bitstreams. Random access refers to a decoding of a bitstream starting from a coded picture that is not the first coded picture in the bitstream. Random access to a bitstream may be needed in various video applications, such as broadcasting and streaming. Random access to a bitstream may enable users to tune in to a program at any time, to switch between different channels, to jump to specific parts of a video, or to switch to a different bitstream for stream adaptation (e.g., adaption of a bit rate, adaptation of a frame rate, adaptation of a spatial resolution, etc.). The insertion of intra random access point (IRAP) pictures into a bitstream at regular intervals may enable random access. Example types of IRAP pictures include IDR pictures, CRA pictures, and BLA pictures. Hence, IDR pictures, CRA pictures and BLA pictures are collectively referred to as random access point (IRAP) pictures.

An IDR picture contains only I slices (i.e., slices in which only intra prediction is used). An IDR picture may be the first picture in the bitstream in decoding order, or may appear later in the bitstream. Each IDR picture is the first picture of a CVS in decoding order. IDR pictures, as specified in HEVC and H.264/AVC, may be used for random access. However, pictures following an IDR picture in decoding order cannot use pictures decoded prior to the IDR picture as reference. Accordingly, bitstreams relying on IDR pictures for random access can have significantly lower coding efficiency than bitstreams that use additional types of random access pictures. An IDR access unit is an access unit that contains an IDR picture.

An IDR picture may cause a decoding process to mark all reference pictures as "unused for reference." Because reference pictures marked as "unused for reference" may be removed from a decoded picture buffer (DPB) that stores the reference pictures, an IDR picture may clean out the DPB. All coded pictures that follow an IDR picture in decoding order can be decoded without inter prediction from any picture that precedes the IDR picture in decoding order. The first picture of each coded video sequence in decoding order is an IDR picture or a BLA picture, or a CRA picture that is the also the first picture of the bitstream. When a coded picture of an access unit is an IDR picture, the access unit may be referred to as an IDR access unit. In some examples, a coded video sequence is a sequence of access units that includes or consists, in decoding order, of an IDR access unit followed by zero or more access units that are not IRAP access units with NoRaslOutputFlag equal to 1 including all subsequent access units up to but not including any subsequent IDR access unit.

Ideally, channel switching and jumping in this manner should be performed with a minimum amount of delay. Channel switching and jumping may be enabled by including random access pictures at regular intervals in video bitstreams. IDR pictures may be used in both H.264/AVC and HEVC as random access pictures. In other words, the IDR picture, specified in both H.264/AVC and HEVC can be used for random access. However, because an IDR picture starts a coded video sequence and may always clean the DPB, pictures following the IDR picture in decoding order cannot use pictures decoded prior, in decoding order, to the IDR picture for reference. Consequently, bitstreams relying on IDR pictures for random access may have significantly lower coding efficiency (e.g., 6% lower coding efficiency). To improve the coding efficiency, a CRA picture in HEVC may allow pictures that follow the CRA picture in decoding order, but precede the CRA picture in output order, to use pictures decoded before the CRA for reference.

The CRA and TSA picture types are new in HEVC and are not available in the H.264/AVC specification. The CRA picture type facilitates decoding that begins from any random access point (RAP) in the middle of a video sequence. Inserting CRA pictures in a video sequence may be more efficient than inserting IDR pictures into the same video sequence. In HEVC, a bitstream starting from a CRA picture may be a conforming bitstream. That is, the portion of a bitstream that starts with a CRA picture may conform to the HEVC specification. A TSA picture can be used to indicate a valid temporal sub-layer switching point.

CRA pictures allow pictures that follow a CRA picture in decoding order, but precede the CRA picture in output order, to use pictures decoded before the CRA picture for reference. Pictures that follow a CRA picture in decoding order, but precede the CRA picture in output order, are referred to as leading pictures associated with the CRA picture (or leading pictures of the CRA picture). That is, to improve coding efficiency, CRA pictures were introduced in HEVC to allow pictures that follow a CRA picture in decoding order but precede the CRA picture in output order to use pictures decoded before the CRA picture as reference. A CRA access unit is an access unit in which the coded picture is a CRA picture.

The leading pictures of a CRA picture are correctly decodable if the decoding starts from an IDR picture or CRA picture occurring before the CRA picture in decoding order. However, the leading pictures of a CRA picture may be non-decodable when random access from the CRA picture occurs. Hence, a video decoder typically decodes the leading pictures of a CRA picture during random access decoding. To prevent error propagation from reference pictures that may not be available depending on where the decoding starts, no picture that follows a CRA picture both in decoding order and output order may use any picture that precedes the CRA picture either in decoding order or output order (which includes the leading pictures) as reference.

Broken link access (BLA) pictures were introduced in HEVC after the introduction of CRA pictures and are based on the concept of CRA pictures. A BLA picture typically originates from bitstream splicing at the position of a CRA picture, and in the spliced bitstream the splicing point CRA picture is changed to a BLA picture. An access unit that contains a RAP picture may be referred to herein as a RAP access unit. A BLA access unit is an access unit that contains a BLA picture.

One difference between BLA pictures and CRA pictures is as follows. For a CRA picture, the associated leading pictures are correctly decodable if the decoding starts from a RAP picture before the CRA picture in decoding order. However, the leading pictures associated with a CRA picture may not be correctly decodable when random access from the CRA picture occurs (i.e., when decoding starts from the CRA picture, or in other words, when the CRA picture is the first picture in the bitstream). In contrast, there may be no scenario where the leading pictures associated with a BLA picture are decodable, even when decoding starts from a RAP picture before the BLA picture in decoding order.

Some of the leading pictures associated with a particular CRA picture or a particular BLA picture may be correctly decodable even when the particular CRA picture or the particular BLA picture is the first picture in a bitstream. These leading pictures may be referred to as decodable leading pictures (DLPs). Other leading pictures may be referred to as non-decodable leading pictures (NLPs). NLPs may also be referred to as tagged for discard (TFD) pictures.

As described above, the example techniques described in this disclosure are related to media file formats and file formats derived based on it. In the example of FIG. 1, source device 12, destination device 14, and/or channel 16 may include one or more file processing units 34. One or more processing circuits may be configured to perform the functionality of the one or more file processing units 34. File processing unit 34 may be instances of post-processing entities. A post-processing entity may include a Media Aware Network Element (MANE), a DASH Aware Network Element (DANE), a server computing device, a personal computing device, a special-purpose computing device, a commercial computing device, or another type of computing device. The post-processing entity may be part of a content delivery network. In some examples, the post-processing entity may be external to source device 12. For example, output interface 22 may output to a post-processing entity which generates the file format as described in this disclosure and stores the resulting file in a storage device or server as described above. For ease of understanding, this disclosure describes the file as being generated from such a post-processing entity.

For instance, in the example of FIG. 1, file processing units 34 include a file generation unit 36 that generates one or more files that encapsulate the bitstream generated by video encoder 20, or encapsulate portions of the bitstream. File generation unit 36 may generate files in accordance with the techniques of this disclosure. In some examples, file generation unit 36 is implemented in source device 12. In such examples, file generation unit 36 may conceptually occur between video encoder 20 and output interface 22 in source device 12. In other examples, file generation unit 36 is implemented in one or more other devices, such as a MANE. In some examples, file generation unit 36 is an instance of a post-processing entity. In examples where the post-processing entity is external to video encoder 20, the post-processing entity may be a separate, distinct unit on source device 12 or may be part of output interface 22.

Furthermore, file processing units 34 may include a file extraction unit 38 that extracts the bitstream or portions thereof from the file. In some examples, destination device 14 implements file extraction unit 38. In such examples, file extraction unit 38 may conceptually occur between input interface 28 and video decoder 30 in destination device 14. In other examples, one or more other devices may implement file extraction unit 38. Video decoder 30 may decode the bitstream extracted from the file by file extraction unit 38. Additionally, in some examples, one or more of file processing units 34 selectively forward portions of the file that contain sufficient encoded video data to enable video decoder 30 to start decoding the video data from a point in the bitstream other than the start of the bitstream.

The following is a further description of file formats and file format standards. File format standards include the ISO base media file format (ISOBMFF, ISO/IEC 14496-12), and other derived from the ISOBMFF, including MPEG-4 file format (ISO/IEC 14496-15), 3GPP file format (3GPP TS 26.244) and AVC file format (ISO/IEC 14496-15).

The ISOBMFF is used as the basis for many codec encapsulation formats, such as the AVC file format, as well as for many multimedia container formats, such as the MPEG-4 file format, the 3GPP file format (3GP), and the DVB file format. In addition to continuous media, such as audio and video, static media, such as images, as well as metadata can be stored in a file conforming to ISOBMFF.

Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams.

A box is the elementary syntax structure in the ISOBMFF, including a four-character coded box type, the byte count of the box, and the payload. An ISOBMFF file includes or consists of a sequence of boxes, and boxes may contain other boxes. A Movie box ("moov") contains the metadata for the continuous media streams that are present in the file. Each of the media streams may be represented in the file as a track. The metadata for a track is enclosed in a Track box ("trak"), while the media content of a track is either enclosed in a Media Data box ("mdat") or directly in a separate file. The media content for tracks may comprise or consist of a sequence of samples, such as audio or video access units.

The ISOBMFF specifies the following types of tracks: a media track, which contains an elementary media stream, a hint track, which either includes media transmission instructions or represents a received packet stream, and a timed metadata track, which comprises time-synchronized metadata. Although originally designed for storage, the ISOBMFF has proven to be very valuable for streaming, e.g. for progressive download or DASH. For streaming purposes, the movie fragments defined in ISOBMFF can be used.

The metadata for each track includes a list of sample description entries, each providing the coding or encapsulation format used in the track and the initialization data needed for processing that format. Each sample of a track is associated with one of the sample description entries of the track.

The ISOBMFF enables specifying sample-specific metadata with various mechanisms. For example, a track box includes a Sample Table ('stbl') box. A Sample Table box of a track contains a sample table that may contain all the time and data indexing of the media samples of the track. The sample table includes sample entries for specific samples of the track. Thus, when a device, such as a device implementing one of file processing units 34, is processing a sample (e.g., preparing to decode encoded pictures of the sample, forward the sample, extract the sample, etc.), the device may be able to refer back to a sample entry in the Sample Table box to determine how to process the sample.

More specifically, a Sample Table box may include a Sample Description ('stbl') box. The Sample Description box may include detailed information about a coding type used, and any initialization information needed for that decoding. To accomplish this, the Sample Description box includes a set of Sample Entry box (i.e., sample entries). The following code defines the Sample Entry and Sample Description box classes of boxes in the ISOBMFF.

```
aligned(8) abstract class SampleEntry (unsigned int(32)
    format)
    extends Box(format){
    const unsigned int(8)[6] reserved = 0;
    unsigned int(16) data_reference_index;
}
aligned(8) class SampleDescriptionBox (unsigned int(32)
    handler_type)
    extends FullBox('stsd', version, 0){
    int i ;
    unsigned int(32) entry_count;
    for (i = 1 ; i <= entry_count ; i++){
        SampleEntry( );      // an instance of a class derived
```

-continued

```
    from SampleEntry
    }
}
```

In the ISOBMFF, a Sample Entry class is an abstract class that is extended for specific media types. For example, a VisualSampleEntry class extends the SampleEntry class and contains information for video data. Similarly, an AudioSampleEntry class extends the SampleEntry class and contains information for audio data. The following code defines the VisualSampleEntry class in the ISOBMFF.

```
class VisualSampleEntry(codingname) extends SampleEntry
    (codingname){
    unsigned int(16)  pre_defined = 0;
    const unsigned int(16) reserved = 0;
    unsigned int(32)[3]   pre_defined = 0;
    unsigned int(16)   width;
    unsigned int(16)   height;
    template unsigned int(32)   horizresolution = 0x00480000;
    // 72 dpi
    template unsigned int(32)   vertresolution  = 0x00480000;
    // 72 dpi
    const unsigned int(32)   reserved = 0;
    template unsigned int(16)   frame_count = 1;
    string[32] compressorname;
    template unsigned int(16)  depth = 0x0018;
    int(16) pre_defined = −1;
    // other boxes from derived specifications
    CleanApertureBox         clap;      // optional
    PixelAspectRatioBox    pasp;      // optional
}
```

Furthermore, the VisualSampleEntry class can be extended for even more specific purposes, such as defining data for specific codecs. For example, the following code defines an HEVCSampleEntry class that extends the VisualSampleEntry class and contains information specific to HEVC.

The Sample Table Box may also include a Sample To Chunk box ("stsc"). The Sample To Chunk box groups samples within the media data into chunks. More specifically, the Sample To Chunk box includes a set of entries. Each entry gives the index of the first chunk of a run of chunks with the same characteristics. Particularly, the Sample To Chunk box includes a sample description index (e.g., sample_description_index). The sample description index is an integer that gives the index of the sample entry that describes the samples in this chunk. Thus, the Sample To Chunk box may enable a device to determine which sample entry is associated with a sample. Because a sample description index is an index to a sample entry, the sample description index may also be referred to as a "sample entry index."

Furthermore, specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF.

The ISOBMFF specification specifies six types of Stream Access Points (SAPs) for use with DASH. The first two SAP types (types 1 and 2), correspond to IDR (Instantaneous Decoder Refresh) pictures in H.264/AVC and HEVC. The third SAP type (type 3) corresponds to open-GOP random access points hence BLA (Broken Link Access) or CRA (Clean Random Access) pictures in HEVC. The fourth SAP type (type 4) corresponds to GDR random access points.

Furthermore, to facilitate random access, "Information technology—Coding of audio-visual objects—Part 15: Carriage of network abstraction layer (NAL) unit structure video in the ISO base media file format," ISO/IEC FDIS 14496-15:2014(E), document N15479, (hereinafter N15479), which is the latest draft L-HEVC file format, specifies that a sample entry applicable to a sample includes a parameter set needed for decoding the IRAP picture or the sample itself includes the parameter set. Particularly, the latest draft L-HEVC file format (in N15479) specifies a restriction on parameter sets in clause 9.7.3.1.1 as follows, with emphasized portions enclosed in tags <emphasis> and </emphasis>:

When the sample entry name is 'lhe1', the following applies:
  If a sample contains at least one IRAP picture as defined in ISO/IEC 23008-2, each parameter set needed for decoding <emphasis>the IRAP pictures and the following pictures in decoding order in each layer that contains an IRAP picture in the sample</emphasis> shall be included either in <emphasis>the sample entries of the tracks carrying layers present in this sample</emphasis> or in that sample itself (possibly by using extractors).
  Otherwise (the sample contains no IRAP picture), each parameter set needed for decoding that sample shall be included either in <emphasis>the sample entries of the tracks carrying layers present in this sample</emphasis> or in any of the samples since the previous sample containing at least one IRAP picture to that sample itself (possibly by using extractors), inclusive.

The purpose of the restriction is to enable random accessing a layer from any IRAP (Intra Random Access Picture) picture without the need of searching and fetching for parameter sets from earlier access units. However, there are at least the following issues regarding the restriction described above. First, it is not clear which pictures exactly are "the IRAP pictures." The intent seems to be "the IRAP pictures in the sample." Second, the inclusion of "and the following pictures in decoding order in each layer that contains an IRAP picture in the sample" in the first bullet item is not necessary, and may unnecessarily disallow putting parameter sets required any of these pictures as part of that access unit itself or a new sample entry. The restriction essentially requires all parameter sets are either in the very first samples or the sample entries applicable to the very first samples. Third, the wording "the sample entries of the tracks carrying layers present in this sample" (in both of the bullet items) implies that the scope of the sample herein is the entire access unit of the entire L-HEVC bitstream, not just the subset within a track. This is inconsistent with the sample definition in clause 9.6.1. Fourth, the above wording itself is not clear, as each track can contain multiple sample entries, the requirement should clearly specify the relevant sample entry of such a track, not any sample entry. For example, for the track containing the current sample in question, the relevant sample entry is the one that applies to the current sample, not any other sample entry.

The following describes example techniques in accordance with this disclosure. The techniques may be applied separately or together. For the current track (i.e., the track containing the current sample in question), it may be straightforward to specify the relevant sample entry to be the one that applies to the current sample. For another track involved, which e.g., contains a reference layer of a layer in the current track, one straightforward approach is to specify the relevant sample entry to be the one that applies to the temporally collocated sample (i.e., with the same decoding time as the current sample) in that another track. However, it is possible that such a temporally collocated sample is not present in that another track. Thus, this approach may not, but could, always work for such scenarios. A temporally collocated sample for a particular sample in a particular track may be defined as being a sample in a track other than the respective track and having the same decoding time as that of the particular sample.

To address this issue, one example technique is to define the concept of temporally collocated sample entry as follows. For any two tracks carrying different parts of the same L-HEVC bitstream, it may be required that the sample entries in the two tracks are temporally aligned, i.e., if a sample entry sampleEntryA in the first track applies to all samples in the first track with decoding times in the range of T1 to T2, inclusive, and all samples in the second track with decoding times in the same range refer to one sample entry sampleEntryB in the second track. Thus, sampleEntryA and sampleEntryB are temporally collocated sample entries. With this, the relevant sample entry can be specified to be the temporally collocated sample entry in that another track. To further simplify, it may be further required that all temporally collocated sample entries use the same value of sample entry index (i.e., sample_description_index). These two requirements can be expressed collectively by requiring that, within all tracks carrying an L-HEVC bitstream, all samples that have the same decoding time shall be associated with the same sample entry index value.

Therefore, to resolve some or all the issues listed above, the restriction on parameter sets is proposed to be changed as follows:

When the sample entry name is 'lhe1', the following applies:

Within all tracks carrying the L-HEVC bitstream, all samples that have the same decoding time shall be associated with the same value of sample entry index (i.e., sample_description_index). For any particular sample in a particular track, the temporally collocated sample entry in another track is the one with the same sample entry index as that of the sample entry in this particular track and applicable to this particular sample, the temporally collocated sample in another track is the one with the same decoding time as that of this particular sample.

For an IRAP picture contained in a layer and in a sample of a track, each parameter set needed for decoding the IRAP picture shall be included in one of the following:
a. the sample entry of this track and applicable to this sample
b. the temporally collocated sample entry of a track carrying a reference layer of this layer
c. this sample itself, possibly by using extractors
d. when present, any of the temporally collocated sample of this sample in a track carrying a reference layer of this layer, possible by using extractors For a non-IRAP picture contained in a layer and in a sample of a track, each parameter set needed for decoding that picture shall be included in one of the following:
a. the sample entry of this track and applicable to this sample
b. the temporally collocated sample entry of a track carrying a reference layer of this layer
c. any of the samples in this track since the previous sample containing an IRAP picture in this layer to this sample itself, inclusive, possibly by using extractors
d. when present, any of the samples in a track carrying a reference layer of this layer since the temporally collocated sample of the previous sample containing an IRAP picture in this layer to the temporally collocated sample of this sample, inclusive, possibly by using extractors.

For ease of explanation, this disclosure may refer to the restriction described above as the "first example restriction of this disclosure." An alternative version of the first example restriction of this disclosure requires that, within all tracks required for each operation point, all samples that have the same decoding time shall be associated with the same value of sample entry index (i.e., sample_description_index).

Alternatively, the restriction on parameter sets is proposed to be changed as follows:

When the sample entry name is 'lhe1', the following applies:

Within all tracks carrying the L-HEVC bitstream, for any particular sample in a particular track, the temporally collocated sample in another track is the one with the same decoding time as that of this particular sample.

For an IRAP picture contained in a layer and in a sample of a track, each parameter set needed for decoding the IRAP picture shall be included in one of the following:
a. the sample entry of this track and applicable to this sample
b. the sample entry of a second track carrying a reference layer of this layer, where the sample entry is applicable to the temporally collocated sample (when present) in the second track or, when the temporally collocated sample is not present, the sample in the second track with decoding time less than but closest to the decoding time of this sample
c. this sample itself, possibly by using extractors
d. when present, any of the temporally collocated sample of this sample in a track carrying a reference layer of this layer, possible by using extractors For a non-IRAP picture contained in a layer and in a sample of a track, each parameter set needed for decoding that picture shall be included in one of the following:
a. the sample entry of this track and applicable to this sample
b. the sample entry of a second track carrying a reference layer of this layer, where the sample entry is applicable to the temporally collocated sample (when present) in the second track or, when the temporally collocated sample is not present, is applicable to the sample in the second track with decoding time less than but closest to the decoding time of this sample c. any of the samples in this track since the previous sample containing an IRAP picture in this layer to this sample itself, inclusive, possibly by using extractors d. when present, any of the samples in a track carrying a reference layer of this layer since the temporally collocated sample of the previous sample containing an IRAP picture in this layer to the temporally collocated sample of this sample, inclusive, possibly by using extractors.

For ease of explanation, this disclosure may refer to the restriction described above as the "second example restriction of this disclosure." File generation unit 36 may ensure that the file conforms to the first or second example restrictions of this disclosure in various ways. For instance, in an example where file generation unit 36 applies the second example restriction of this disclosure, file generation unit 36 may determine whether conditions (b), (c), or (d) listed above are satisfied for an IRAP picture contained in a current sample of a current track of the file. In this example, in response to determining conditions (b), (c), and (d) are not satisfied, file generation unit 36 may include a copy of each parameter set needed for decoding the IRAP picture in a sample entry of the current track that is applicable to the current sample. Likewise, file generation unit 36 may determine whether conditions (b), (c), or (d) listed above are satisfied for a non-IRAP picture contained in a current sample of a current track of the file. In this example, in response to determining conditions (b), (c), and (d) are not satisfied, file generation unit 36 may include a copy of each parameter set needed for decoding the non-IRAP picture in a sample entry of the current track that is applicable to the current sample.

Thus, with regard to the second example restriction of this disclosure, for each respective track of a plurality of tracks, media content for the respective track comprises a respective sequence of samples and a relevant sample entry for a sample of the respective track is a sample entry of the respective track that is applicable to the sample. Furthermore, for each respective IRAP picture of the plurality of IRAP pictures, the respective IRAP picture's layer contains the respective IRAP picture and is a layer of a multi-layer bitstream (e.g., a L-HEVC bitstream), the respective IRAP picture's track contains the respective IRAP picture's sample, the respective IRAP picture's sample contains the respective IRAP picture, and the plurality of tracks includes the respective IRAP picture's track. In this example, a restriction may be applicable when a sample entry name of the relevant sample entry for the respective IRAP picture have a particular value, such as 'lhe1'. In other examples, the restriction may be applicable when a sample entry name of the relevant sample entry for the respective IRAP picture has another value. The restriction requires that each parameter set of the plurality of parameter sets that is required for decoding the respective IRAP picture is in at least one of the following:

a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer.

Furthermore, in the description of the second example restriction above, a first parameter set required for decoding the particular IRAP picture may be referenced by a first set of one or more extractors present in the particular IRAP picture's sample. Similarly, a second parameter set required for decoding the particular IRAP picture may be referenced by a second set of one or more extractors present in a temporally collocated sample of the particular IRAP picture in a track of the plurality of tracks carrying a reference layer for the particular IRAP picture's layer.

In at least some instances, the second example restriction of this disclosure requires that, for each respective non-IRAP picture of the plurality of non-IRAP pictures, the respective non-IRAP picture's layer contains the respective non-IRAP picture and is a layer of the multi-layer bitstream, the respective non-IRAP picture's track contains the respective non-IRAP picture's sample, the respective IRAP picture's sample contains the respective IRAP picture, and the plurality of tracks includes the respective non-IRAP picture's track. Furthermore, in some examples, the restriction is applicable when a sample entry name of the relevant sample entry for the respective non-IRAP picture is 'lhe1'. In other examples, the restriction may be applicable when a sample entry name of the relevant sample entry for the respective non-IRAP picture has another value. In this example, the restriction may further require that each of the parameter sets that is required for decoding the respective non-IRAP picture is in at least one of the following:

a sample entry of the respective non-IRAP picture's track that is applicable to the respective non-IRAP picture's sample, a sample entry of a non-corresponding track for the respective non-IRAP picture carrying a reference layer of the respective non-IRAP picture's layer, the non-corresponding track for the respective non-IRAP picture being a track other than the respective non-IRAP picture's track in the plurality of tracks, the sample entry of the non-corresponding track for the respective non-IRAP picture being applicable to a temporally collocated sample in the non-corresponding track for the respective non-IRAP picture or, when the temporally collocated sample in the non-corresponding track for the respective non-IRAP picture is not present, a sample in the non-corresponding track for the respective non-IRAP picture with a decoding time less than but closest to a decoding time of the respective non-IRAP picture's sample, any sample of the respective non-IRAP picture's track following a previous IRAP picture-containing sample in the respective non-IRAP picture's layer and up to the respective non-IRAP picture's sample, inclusive, and any sample of any track of the plurality of tracks carrying any reference layer of the respective non-IRAP picture's layer following a temporally collocated sample of the previous IRAP picture-containing sample in the respective non-IRAP picture's layer and up to a temporally collocated sample of the respective non-IRAP picture's sample, inclusive.

Furthermore, in the description of the second example restriction above, a first parameter set required for decoding the particular non-IRAP picture may be referenced by a first set of one or more extractors present in the particular non-IRAP picture's sample. Similarly, a second parameter set required for decoding the particular non-IRAP picture may be referenced by a second set of one or more extractors present in a temporally collocated sample of the particular non-IRAP picture in a track of the plurality of tracks carrying a reference layer for the particular non-IRAP picture's layer.

Being able to rely on either the first or the second example restrictions of this disclosure may enhance the ability of video decoder 30 to perform random access. For example, video decoder 30 may need to access particular parameter sets to start decoding a bitstream from a particular point after the start of the bitstream. Hence, a file processing unit, such as file extraction unit 38, may be able to determine whether particular parameter sets are already available to video decoder 30 from samples of the file, per conditions (c) and (d), or whether to use copies of the particular parameter sets stored in sample entries, per conditions (a) and (b), to specifically provide one or more of the particular parameter sets to video decoder 30.

In the example restrictions of this disclosure described above, the plurality of parameter sets may include at least one of: a video parameter set as defined in ISO/IEC 23008-2, a sequence parameter set as defined in ISO/IEC 23008-2, and a picture parameter set as defined in ISO/IEC 23008-2. In other examples of this disclosure, instances of "less than" in the above examples are changed to "greater than" in some or all cases. Alternatively or additionally, in some or each of the above examples, all instances of "a reference layer of this layer" are changed to "a reference layer of a layer carried in this track". Alternatively or additionally, in some or each of the above examples, all instances of "the previous sample containing an IRAP picture in this layer" are changed to "the previous sample containing an IRAP picture in a layer in this track".

Furthermore, in some examples of this disclosure, a bitstream construction process for randomly accessing a layer at a particular IRAP picture is specified, including putting parameter sets from the relevant sample entries at the beginning of the bitstream and then putting NAL units from the tracks following decoding time and increasing order layer IDs for NAL units within an access unit, and then specifying that each parameter set needed for decoding any picture must be available in the constructed bitstream before the picture.

Figure 2:
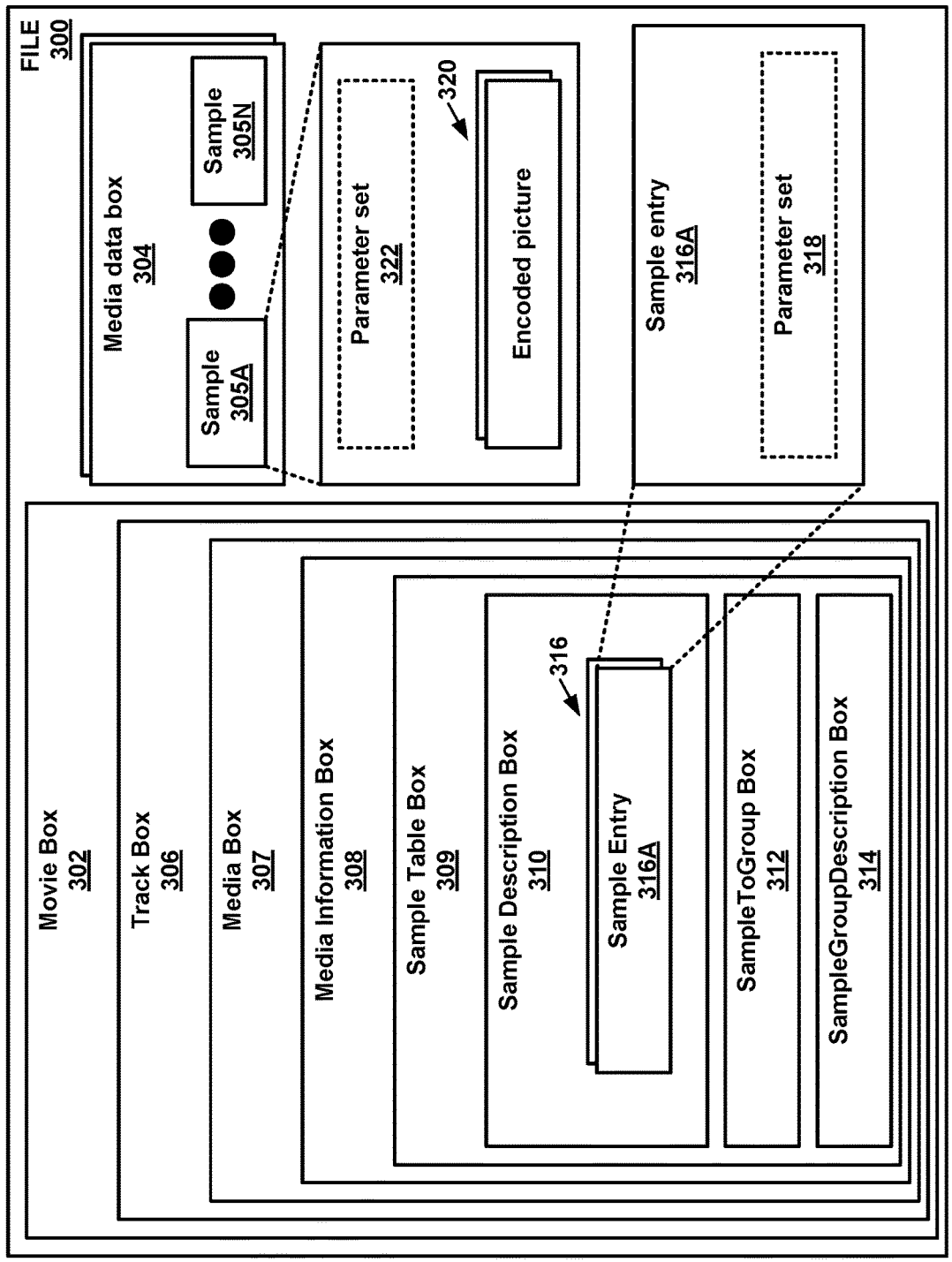
FIG. 2 is a block diagram illustrating an example structure of a file, in accordance with one or more techniques of this disclosure.

FIG. 2 is a block diagram illustrating an example structure of a file 300, in accordance with one or more techniques of this disclosure. File 300 may be generated by a file processing unit, such as file generation unit 36 (FIG. 1). In the example of FIG. 2, file 300 includes a Movie box 302 and a plurality of Media Data boxes 304. Although illustrated in the example of FIG. 2 as being in the same file, in other examples Movie box 302 and Media Data boxes 304 may be in separate files. As indicated above, a box may be an object-oriented building block defined by a unique type identifier and length. For instance, a box may be the elementary syntax structure in ISOBMFF, including a four-character coded box type, a byte count of the box, and a payload.

Movie box 302 may contain metadata for tracks of file 300. Each track of file 300 may comprise a continuous stream of media data. Each of Media Data boxes 304 may include one or more samples 305A through 305N (collectively, "samples 305"). Furthermore, in the example of FIG. 2, Movie box 302 includes a Track box 306. Track box 306 may enclose metadata for a track of file 300. In other examples, Movie box 302 may include multiple Track boxes for different tracks of file 300. Track box 306 includes a Media box 307. Media box 307 may contain objects that declare information about the media data within the track. Media box 307 includes a Media Information box 308. Media Information box 308 may contain objects that declare characteristic information of the media of the track. Media Information box 308 includes a Sample Table box 309. Sample Table box 309 may specify sample-specific metadata.

Sample Table box 309 may include a sample description box 310. Additionally, Sample Table box 309 may include zero or more SampleToGroup boxes and zero or more SampleGroupDescription boxes. In the example of FIG. 2, Sample Table box 309 includes a SampleToGroup box 312 and a SampleGroupDescription box 314. In other examples, Sample Table box 309 may include other boxes in addition to Sample Description Box 310, SampleToGroup box 312, and SampleGroupDescription box 314, and/or may include multiple SampleToGroup boxes and SampleGroupDescription boxes. SampleToGroup box 312 may map samples (e.g., particular ones of samples 305) to a group of samples. SampleGroupDescription box 314 may specify a property shared by the samples in the group of samples (i.e., sample group).

Sample Description Box 310 comprises a set of sample entries 316 for the track. Each respective sample entry of sample entries 316 applies to one or more samples of the track. In the example of FIG. 2, the set of sample entries 316 includes a sample entry 316A. As described elsewhere in this disclosure, in accordance with a technique of this disclosure, for an IRAP picture contained in a layer and in a sample of a track, each parameter set needed for decoding the IRAP picture may be included in a sample entry of the track and applicable to this sample. Hence, in the example of FIG. 2, sample entry 316A may include a parameter set 318 needed for decoding an IRAP picture contained in a track corresponding to Track Box 306.

Furthermore, as described elsewhere in this disclosure, in accordance with a technique of this disclosure, for an IRAP picture contained in an enhancement or other non-base layer and in a sample of a track, each parameter set needed for decoding the IRAP picture may be included in a sample entry of a second track carrying a reference layer of the enhancement or other non-base layer, where the sample entry is applicable to the temporally collocated sample (when present) in the second track or, when the temporally collocated sample is not present, the sample in the second track with decoding time less than but closest to the decoding time of this sample. In the example of FIG. 2, a first track may include a particular sample containing an IRAP picture and Track Box 306 may correspond to the second track. In this example, sample entry 316A may include the parameter sets needed for decoding the IRAP picture in the particular sample if sample entry 316A is applicable to a sample in the second track that is temporally collocated with the particular sample in the first track, or sample entry 316A is applicable to a sample in the second track that has a decoding time less than but closest to the decoding time of the particular sample.

Moreover, as described elsewhere in this disclosure, for a non-IRAP picture contained in a layer and in a sample of a track, each parameter set needed for decoding that picture may be in a sample entry of the track and applicable to this sample. Thus, in the example of FIG. 2, assuming a particular sample includes a non-IRAP picture and sample entry 316A is in the same track as the particular sample and is applicable to the particular sample, sample entry 316A may include a parameter set 318 needed for decoding the non-IRAP picture.

Additionally, for a non-IRAP picture contained in a layer and in a sample of a track, each parameter set needed for decoding that picture may be in the sample entry of a second track carrying a reference layer of this layer, where the sample entry is applicable to the temporally collocated sample (when present) in the second track or, when the temporally collocated sample is not present, is applicable to the sample in the second track with decoding time less than but closest to the decoding time of this sample. In the example of FIG. 2, a first track may include a particular sample containing a non-IRAP picture and Track Box 306 may correspond to the second track. In this example, sample entry 316A may include the parameter sets needed for decoding the non-IRAP picture in the particular sample if sample entry 316A is applicable to a sample in the second track that is temporally collocated with the particular sample in the first track, or sample entry 316A is applicable to a sample in the second track that has a decoding time less than but closest to the decoding time of the particular sample.

Additionally, as described elsewhere in this disclosure, in accordance with a technique of this disclosure, for an IRAP picture contained in a layer and in a sample of a track, each parameter set needed for decoding the IRAP picture may be included in the sample itself. Thus, as shown in the example of FIG. 2, sample 305A, in Media data box 304, may include one or more encoded pictures 320 and one or more parameter sets, such as parameter set 322. Furthermore, as described elsewhere in this disclosure, for an IRAP picture contained in a layer and in a sample of a track, each parameter set needed for decoding the IRAP picture may be included in a temporally collocated sample of this sample in a track carrying a reference layer of this layer. Thus, in the example of FIG. 2, a particular sample includes an IRAP picture, the particular sample is in a first track, and sample 305A is in a second track. In this example, sample 305A may include parameter sets needed for decoding the particular sample is sample 305A and the particular sample are collocated and the first track is a reference track of the second track.

As described elsewhere in this disclosure, for a non-IRAP picture contained in a layer and in a sample of a track, each parameter set needed for decoding that picture may be included in any of the samples in this track since the previous sample containing an IRAP picture in this layer to this sample itself, inclusive, possibly by using extractors. For instance, in the example of FIG. 2, any samples (e.g., sample 305A) of a track containing a non-IRAP picture following a previous sample containing an IRAP picture may include parameter sets (e.g., parameter set 322) needed for decoding the non-IRAP picture.

Moreover, as described elsewhere in this disclosure, for a non-IRAP picture contained in a layer and in a sample of a track, each parameter set needed for decoding that picture may be included in, when present, any of the samples in a track carrying a reference layer of this layer following the temporally collocated sample of the previous sample containing an IRAP picture in this layer to the temporally collocated sample of this sample, inclusive, possibly by using extractors. Thus, in the example of FIG. 2, for a non-IRAP picture contained in a particular layer and in a sample of a first track, each parameter set needed for decoding the non-IRAP picture may be included in sample 305A if sample 305A is in a track carrying a reference layer of the particular layer and sample 305A follows a sample collocated with a sample of the particular layer containing an IRAP picture.

Figure 3:
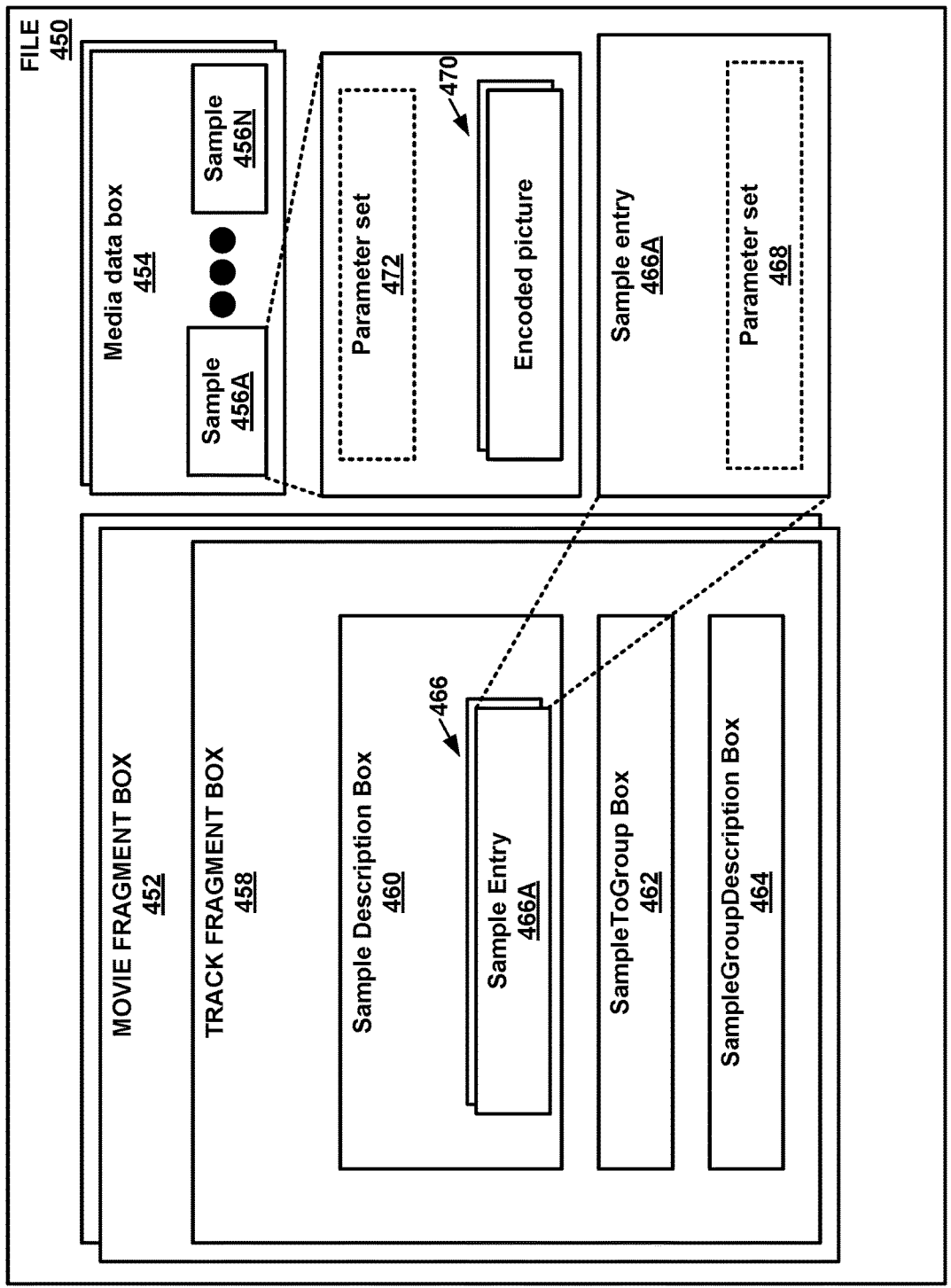
FIG. 3 is a block diagram illustrating example structures of a file, in accordance with one or more techniques of this disclosure.

FIG. 3 is a block diagram illustrating example structures of a file 450, in accordance with one or more techniques of this disclosure. File 450 may be generated by a file processing unit, such as file generation unit 36 (FIG. 1). In the example of FIG. 3, file 450 includes one or more Movie Fragment boxes 452 and a plurality of media data boxes 454. Although illustrated in the example of FIG. 3 as being in the same file, in other examples Movie Fragment boxes 452 and Media Data boxes 454 may be in separate files. Each of Media Data boxes 454 may include one or more samples 456A through 456N (collectively, "samples 456"). Each of the Movie Fragment boxes corresponds to a movie fragment. Each movie fragment may comprise a set of track fragments. There may be zero or more track fragments per track.

In the example of FIG. 3, a Movie Fragment box 452 provides information regarding a corresponding movie fragment. Such information would have previously been in a Movie box, such as Movie box 302 (FIG. 2). Movie Fragment box 452 may include a Track Fragment box 458. Track Fragment box 458 corresponds to a track fragment and provides information about the track fragment.

For instance, in the example of FIG. 3, Track Fragment box 458 may include a Sample Description box 460, zero or more SampleToGroup boxes, and zero or more SampleGroupDescription boxes. In the example of FIG. 3, Track Fragment box 458 contains one or more SampleToGroup boxes 462 and one or more SampleGroupDescription boxes 464 that contain information about the track fragment corresponding to Track Fragment box 458. Sample Description Box 460 comprises a set of sample entries 466 for the track fragment. Each respective sample entry of sample entries 466 applies to one or more samples of the track. In the example of FIG. 3, the set of sample entries 466 includes a sample entry 466A. As shown in the example of FIG. 3, sample entry 466A may include a parameter set 468. Furthermore, as shown in the example of FIG. 3, sample 456A, in Media data box 454, may include one or more encoded pictures 470 and one or more parameter sets, such as parameter set 472. The restrictions described elsewhere in this disclosure with respect to locations of parameter sets required for decoding IRAP pictures and non-IRAP pictures may apply with respect to sample entries 466 and samples 456 in file 450.

Figure 4:
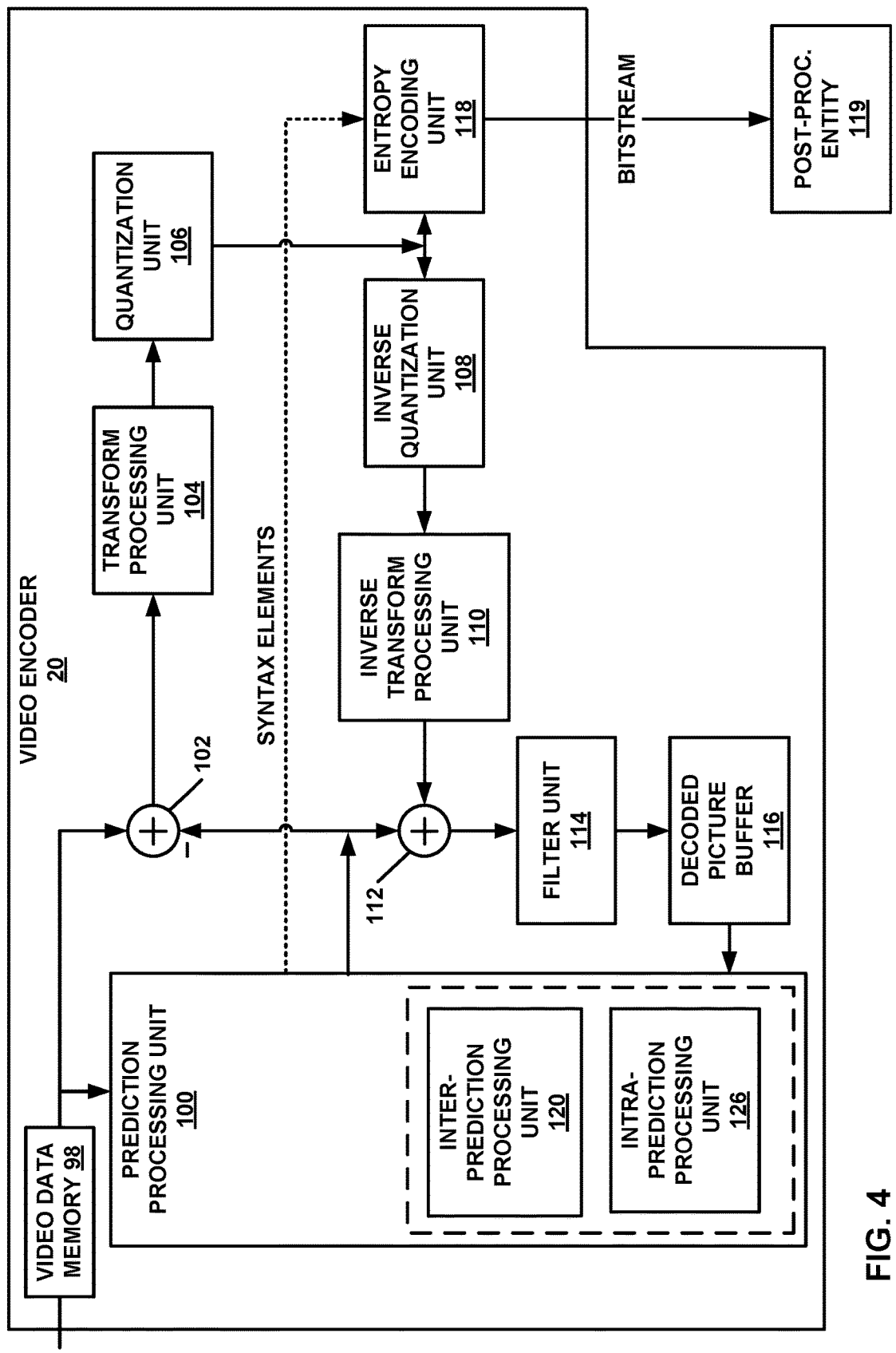
FIG. 4 is a block diagram illustrating an example video encoder.

FIG. 4 is a block diagram illustrating an example video encoder 20. FIG. 4 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 4, video encoder 20 includes a video data memory 98, a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). In other examples, video encoder 20 may include more, fewer, or different functional components.

Video data memory 98 may store video data to be encoded by the components of video encoder 20. The video data stored in video data memory 98 may be obtained, for example, from video source 18 (FIG. 1). Decoded picture buffer 116 may be a reference picture memory that stores reference video data for use in encoding video data by video encoder 20, e.g., in intra- or inter-coding modes. Video data memory 98 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 98 and decoded picture buffer 116 may be provided by the same memory device or separate memory devices. In various examples, video data memory 98 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU.

Inter-prediction processing unit 120 may generate predictive data for a PU by performing inter prediction on each PU of a CU. The predictive data for the PU may include one or more predictive sample blocks of the PU and motion information for the PU. Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the coding blocks (e.g., luma, Cb and Cr coding blocks) of a CU and the selected predictive sample blocks (e.g., predictive luma, Cb and Cr blocks) of the PUs of the CU, residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform partitioning (e.g., quad-tree partitioning) to partition the residual blocks associated with a CU into transform blocks associated with TUs of the CU. Thus, in some examples, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC)

operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In addition to the actions described above, video encoder 20 may form parameter sets, such as VPSs, PPSs, and SPSs. The parameter sets formed by video encoder 20 may include parameters representing various information about the bitstream, such as enabled coding tools, a number of layers included in the bitstream, video usability information (VUI) that may be used for determining when to decode and output pictures of the bitstream, picture size information, profile-tier-level (PTL) information, and other types of information. Video encoder 20 may include, in the bitstream, data indicative of the parameter sets.

As shown in the example of FIG. 4, a post processing entity (PPE) 119 may obtain a bitstream generated by video encoder 20. PPE 119 may be an instance of file generation unit 36 (FIG. 1). PPE 119 may be an example of a video entity, such as a file generation unit, MANE or splicing/editing device, that may process encoded video data. In some instances, PPE 119 may be an example of a network entity. In some video encoding systems, PPE 119 and video encoder 20 may be parts of separate devices, while in other instances, the functionality described with respect to PPE 119 may be performed by the same device that comprises video encoder 20. As described above, PPE 119 may be configured to perform the example techniques described above (e.g., format files in accordance with one or more examples described above), and a file processing unit (e.g., of destination device 14, a MANE, or another device) may be configured to obtain the file as formatted by PPE 119.

In accordance with a technique of this disclosure, PPE 119 may generate or modify a file such that the file conforms to either of the first or second example restrictions of this disclosure. For example, a current parameter set may be needed for decoding a current coded IRAP picture in the bitstream, a current sample contains the current coded IRAP picture, the current sample is in a current track, and the current coded IRAP picture is in a current layer. In this example, PPE 119 may ensure that the current parameter set is present in (1) the current sample, (2) a sample that is in a track carrying a reference layer of the current layer and that is temporally collocated with the current sample, or (3) in a sample entry of any given track carrying a reference layer of the current layer where the sample entry is applicable to a temporally collocated sample in the given track or a sample in the given track with a decoding time less than but closest to the decoding time of the current sample. In this example, if the above do not apply, PPE 119 may include a copy of the current parameter set in a sample entry of the current track that is applicable to the current sample. In some examples, PPE 119 may always include a copy of the current parameter set in the sample entry of the current track that is applicable to the current sample.

Similarly, a current parameter set may be needed for decoding a current coded non-IRAP picture in the bitstream, a current sample contains the current coded non-IRAP picture, the current sample is in a current track, and the current coded IRAP picture is in a current layer. In this example, PPE 119 may ensure that the current parameter set is present in (1) any sample of the current track following a previous sample in the current track containing an IRAP picture in the current layer up to and including the current sample, (2) any sample that is in a range of samples of given track carrying a reference layer of the current layer, the range starting from the sample of the given track is collocated with the previous sample of the current track containing an IRAP picture in the current layer and continues through a sample of the given track temporally collocated with the current sample, or (3) a sample entry of any given track carrying a reference layer of the current layer where the sample entry is applicable to a sample in the given track collocated with the current sample or a sample in the given track with a decoding time less than but closest to the decoding time of the current sample. In this example, if the above do not apply, PPE 119 may include a copy of the current parameter set in a sample entry of the current track that is applicable to the current sample. In some examples, PPE 119 may always include a copy of the current parameter set in the sample entry of the current track that is applicable to the current sample.

Figure 5:
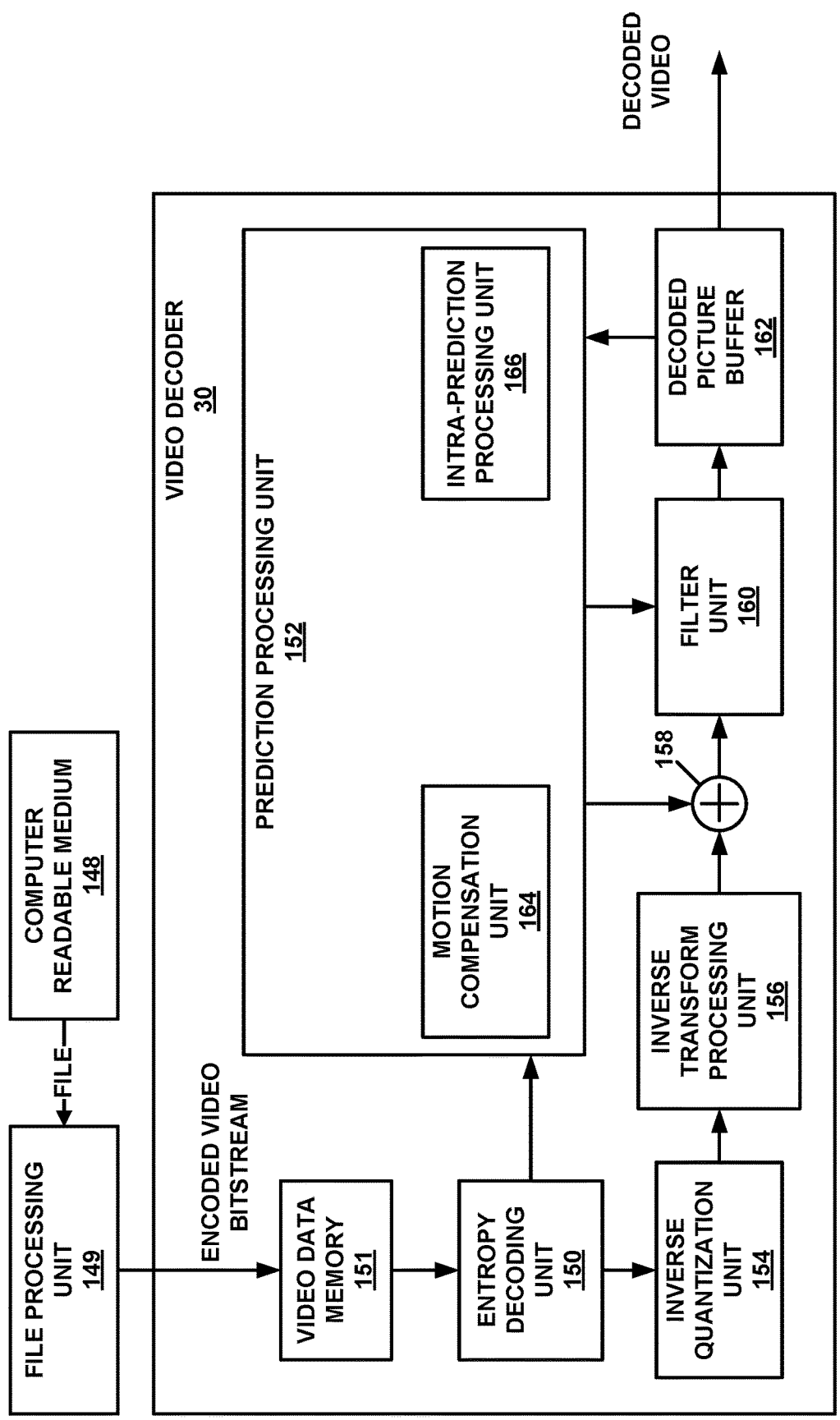
FIG. 5 is a block diagram illustrating an example video decoder.

FIG. 5 is a block diagram illustrating an example video decoder 30. FIG. 5 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 5, video decoder 30 includes a video data memory 151, an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from channel 16 (FIG. 1) or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

Video data memory 151, i.e., a CPB, may receive and store encoded video data (e.g., NAL units) of a bitstream. Entropy decoding unit 150 may receive encoded video data (e.g., NAL units) from video data memory 151 and may parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained (e.g., extracted) from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice. The PPS may, in turn, identify an SPS applicable to the picture. The SPS may, in turn, identify an VPS applicable to the picture.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra-prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive blocks (e.g., predictive luma, Cb and Cr blocks) for the PU.

Reconstruction unit 158 may use the transform blocks (e.g., luma, Cb and Cr transform blocks) associated with TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) of the CU. For example, reconstruction unit 158 may add samples of the transform blocks (e.g., luma, Cb and Cr transform blocks) to corresponding samples of the predictive blocks (e.g., predictive luma, Cb and Cr blocks) to reconstruct the coding blocks (e.g., luma, Cb and Cr coding blocks) of the CU.

Filter unit 160 may perform a deblocking operation to reduce blocking artifacts associated with the coding blocks (e.g., luma, Cb and Cr coding blocks) of the CU. Video decoder 30 may store the coding blocks (e.g., luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb and Cr blocks) in decoded picture buffer 162, intra prediction or inter prediction operations on PUs of other CUs. In this way, video decoder 30 may extract, from the bitstream, transform coefficient levels of a significant coefficient block, inverse quantize the transform coefficient levels, apply a transform to the transform coefficient levels to generate a transform block, generate, based at least in part on the transform block, a coding block, and output the coding block for display.

In the example of FIG. 5, a computer readable medium 148 comprises a computer readable storage medium such as a memory, optical disc, magnetic disk, or other type of non-transitory storage medium from which a computing device is able to read data. In some examples where computer readable medium 148 comprises a computer readable storage medium, the computer readable storage medium forms part of a device, such as source device 12 (FIG. 1), one or more of file processing units 34 (FIG. 1) (e.g., file extraction unit 38), a content delivery network device, or another type of device. In some examples, computer readable medium 148 comprises a computer-readable communication medium, such as an optical fiber, communication cable, electro-magnetic wave, or other types of media from which a computing device is able to read data.

Furthermore, in the example of FIG. 5, a file processing unit 149 receives a file or portions of a file from computer readable medium 148. File processing unit 149 may be an instance of file extraction unit 38 (FIG. 1) or another one of file processing units 34 (FIG. 1). File processing unit 149 may be implemented by one or more processing circuits of a device, such as destination device 14, a MANE, a content delivery network device, or another type of device.

File processing unit 149 may process the file. For instance, file processing unit 149 may obtain NAL units from the file. In the example of FIG. 5, the encoded video bitstream received by video decoder 30 may comprise NAL units obtained from the file. In accordance with a technique of this disclosure, file processing unit 149 may be configured to rely on the file conforming to the first or second example restrictions of this disclosure. For instance, file processing unit 149 may be configured to send a copy of a parameter set needed for decoding a picture from a sample entry of a file to video decoder 30 if the parameter set is not available in appropriate samples.

Figure 6:
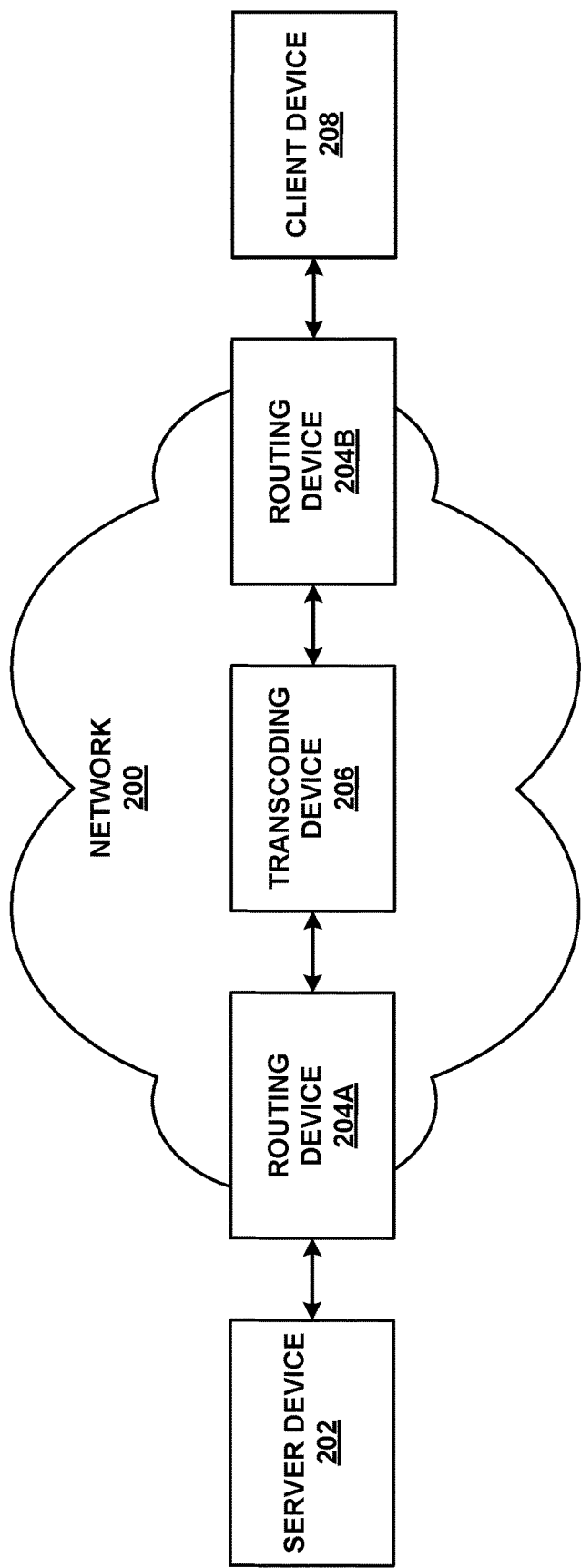
FIG. 6 is a block diagram illustrating an example set of devices that form part of network.

FIG. 6 is a block diagram illustrating an example set of devices that form part of network 200. In this example, network 200 includes routing devices 204A, 204B (routing devices 204) and transcoding device 206. Routing devices 204 and transcoding device 206 are intended to represent a small number of devices that may form part of network 200.

Other network devices, such as switches, hubs, gateways, firewalls, bridges, and other such devices may also be included within network 200. Moreover, additional network devices may be provided along a network path between server device 202 and client device 208. Server device 202 may correspond to source device 12 (FIG. 1), while client device 208 may correspond to destination device 14 (FIG. 1), in some examples.

In general, routing devices 204 implement one or more routing protocols to exchange network data through network 200. In some examples, routing devices 404 may be configured to perform proxy or cache operations. Therefore, in some examples, routing devices 204 may be referred to as proxy devices. In general, routing devices 204 execute routing protocols to discover routes through network 200. By executing such routing protocols, routing device 204B may discover a network route from itself to server device 202 via routing device 204A.

The techniques of this disclosure may be implemented by network devices such as routing devices 204 and transcoding device 206, but also may be implemented by client device 208. In this manner, routing devices 204, transcoding device 206, and client device 208 represent examples of devices configured to perform the techniques of this disclosure.

Figure 7:
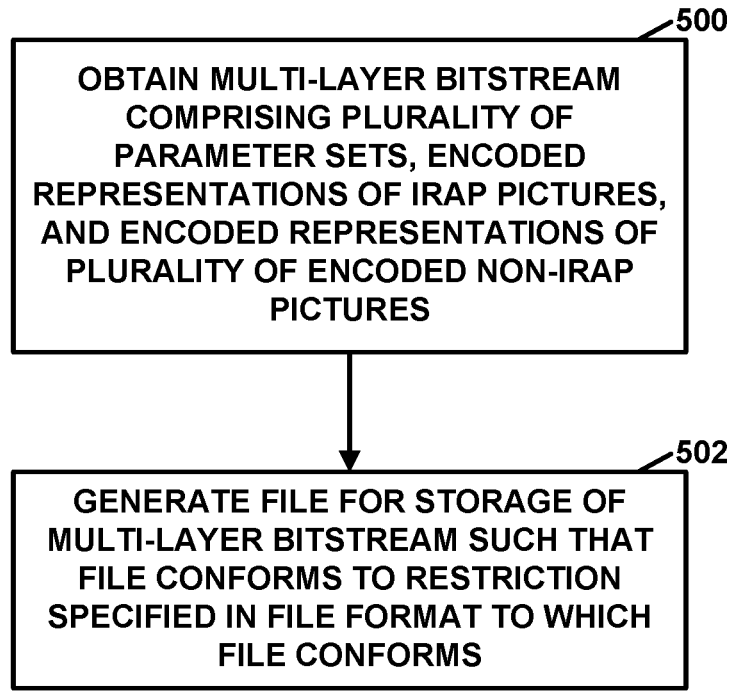
FIG. 7 is a flowchart illustrating an example operation of a device in accordance with a technique of this disclosure.

FIG. 7 is a flowchart illustrating an example operation of a device in accordance with a technique of this disclosure. The flowcharts of this disclosure are provided as examples. In other examples, different actions may be performed or actions may be performed in different orders, or in parallel.

The operation of FIG. 7 may be performed by various devices, such as source device 12 (FIG. 1), file processing units 34 (FIG. 1), post-processing entity 119 (FIG. 4), or another type of device. In the example of FIG. 7, the device obtains a multi-layer bitstream comprising a plurality of parameter sets, encoded representations of a plurality of IRAP pictures of the video data, and encoded representations of a plurality of non-IRAP pictures of the video data (500). For example, source device 12 of FIG. 1 may receive the multi-layer bitstream from video encoder 20 (FIG. 1). As another example, post-processing entity 119 (FIG. 4) may receive the multi-layer bitstream from video encoder 20 (FIG. 4). Additionally, in the example of FIG. 7, the device generates a file for storage of the multi-layer bitstream such that the file complies with a restriction specified in a file format to which the file conforms (502). Generating a file may comprise storing data representing the file to a data storage medium. The restriction may be the first or the second example restrictions of this disclosure as described above. The restriction is not required by the syntax of the file format, but by other rules on the content of a file conforming to the file format.

Figure 8:
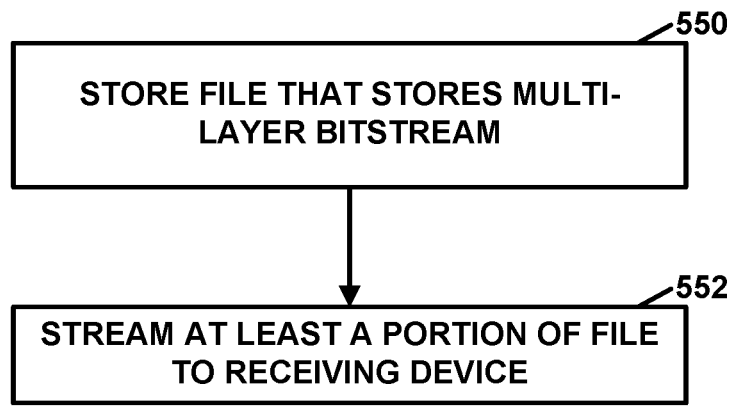
FIG. 8 is a flowchart illustrating an example operation of a device in accordance with a technique of this disclosure.

FIG. 8 is a flowchart illustrating an example operation of a device, in accordance with a technique of this disclosure. The operation of FIG. 8 may be performed by various devices, such as source device 12 (FIG. 1), file processing units 34 (FIG. 1), post-processing entity 119 (FIG. 4), server device 202 (FIG. 6), transcoding device 206 (FIG. 6), a MANE, or another type of device.

In the example of FIG. 8, the device stores a file that stores a multi-layer bitstream (550). The file complies with a restriction specified in a file format to which the file conforms. For instance, the restriction may be the first or the second example restrictions of this disclosure as described above. Furthermore, in the example of FIG. 8, the device may stream at least a portion of the file to a receiving device (552). In some examples, the device uses DASH or another streaming technology to stream the file to the receiving device. Alternatively, the device may provide the file to a server device that transports the file to the receiving device, e.g., according to DASH. The receiving device may be one of a variety of various types of devices, such as destination device 14, client device 208, or another type of device. For instance, the device may stream a portion of the file starting from a sample containing an IRAP picture.

Figure 9:
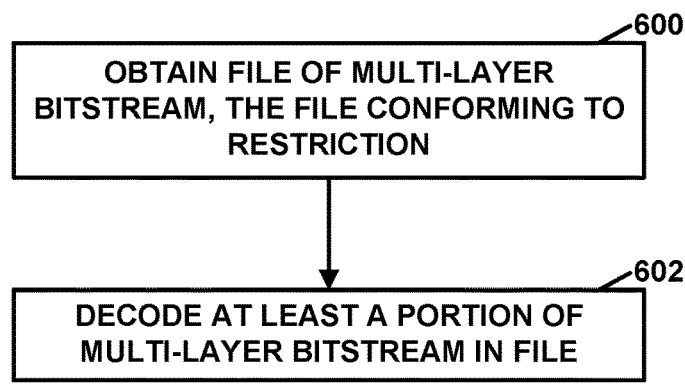
FIG. 9 is a flowchart illustrating an example operation of a device in accordance with a technique of this disclosure.

FIG. 9 is a flowchart illustrating an example operation of a device, in accordance with a technique of this disclosure. The operation of FIG. 9 may be performed by various types of devices, such as destination device 14 (FIG. 1), client device 208 (FIG. 6), or another type of device.

In the example of FIG. 9, the device may obtain a file storing a multi-layer bitstream (600). The file complies with a restriction specified in a file format to which the file conforms. For instance, the restriction may be the first or the second example restrictions of this disclosure as described above. Furthermore, in the example of FIG. 9, the device may decode at least a portion of the multi-layer bitstream in the file (602). For instance, the device may decode a portion of the multi-layer bitstream starting at a particular IRAP access unit (i.e., an access unit containing a particular IRAP picture).

FIG. 10, FIG. 11, FIG. 12, and FIG. 13 are flowcharts illustrating example operations of a device to access a parameter set, in accordance with a technique of this disclosure. The example operations of FIG. 10, FIG. 11, FIG. 12, and FIG. 13 may be performed as part of the operation of FIG. 8. For instance, a device may stream at least portions of the file corresponding to an access unit containing an IRAP picture based on a determination that a video decoder of the receiving device is configured to start decoding the multi-layer bitstream from the IRAP picture. Moreover, the example operations of FIG. 10, FIG. 11, FIG. 12, and FIG. 13 may be performed as part of the operation of FIG. 9. For instance, a device may decode the multi-layer bitstream in (602) based on a determination that a video decoder of the device is configured to start decoding the multi-layer bitstream from an IRAP picture in the multi-layer bitstream.

Figure 10:
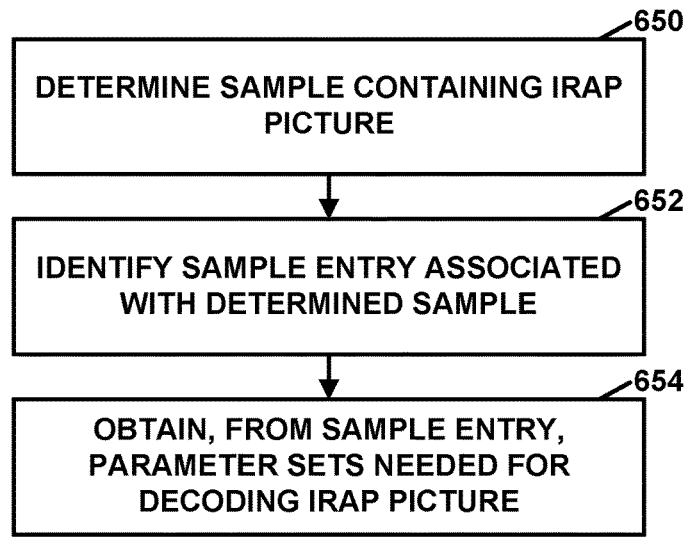
FIG. 10 is a flowchart illustrating an example operation of a device to use a parameter set stored in a sample entry, in accordance with a technique of this disclosure.

FIG. 10 is a flowchart illustrating an example operation of a device to use a parameter set stored in a sample entry, in accordance with a technique of this disclosure. As illustrated in the example of FIG. 10, a device may determine a sample containing an IRAP picture (650). For instance, the device may determine, based on a sample group defined in a track box of the file, which samples include IRAP pictures. Furthermore, in the example of FIG. 10, the device may identify a sample entry applicable to the determined sample (652). For instance, the device may determine, based on a Sample To Chunk box of the track, which sample entry in a Sample Table box of the track is applicable to the determined sample. The device may then obtain, from the identified sample entry, parameter sets needed for decoding the IRAP picture (654). The device may use the parameter sets needed for decoding the IRAP picture in various ways. For example, the device may determine, based on the parameter sets, whether video decoder 30 is configured to decode the bitstream starting from the IRAP picture. For instance, in this example, the device may determine whether video decoder 30 is configured to decode the bitstream based on profile, tier, and level (PTL) data specified in a VPS. In some examples, the device may provide the parameter sets to video decoder 30 to enable video decoder 30 to decode the IRAP picture.

Figure 11:
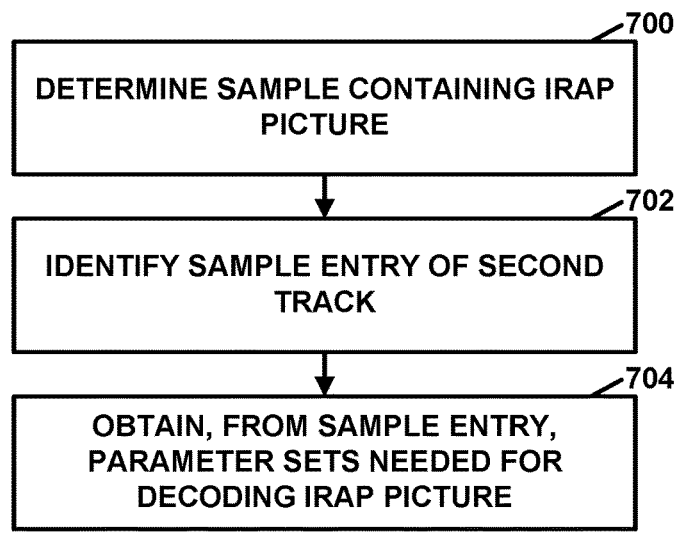
FIG. 11 is a flowchart illustrating an example operation of a device to use a parameter set stored in a sample entry of a different track, in accordance with a technique of this disclosure.

FIG. 11 is a flowchart illustrating an example operation of a device to use a parameter set stored in a sample entry of a different track, in accordance with a technique of this disclosure. In the example of FIG. 11, a device may determine a sample containing an IRAP picture (700). In this example, the sample may be in a first track of the file. In some examples, to determine the sample containing the IRAP picture, the device may determine, based on a sample group defined in a track box of the file, which samples include IRAP pictures. Furthermore, in the example of FIG. 11, the device may identify a sample entry of a second track that carries a reference layer of the first track (702). The identified sample entry may be applicable to a sample of the second track that is temporally collocated with the determined sample of the first track. Alternatively, when no sample of the second track is temporally collocated with the determined sample of the first track, the identified sample entry may be applicable to a sample in the second track with a decoding time less than but closest to the decoding time of the determined sample of the first track. For instance, the device may use a Sample To Chunk box of the second track to determine the sample entries applicable to samples of the second track.

Furthermore, in the example of FIG. 11, the device may obtain, from the identified sample entry, parameter sets needed for decoding the IRAP picture (704). For instance, in this example, the device may determine whether video decoder 30 is configured to decode the bitstream based on PTL data specified in a VPS. In some examples, the device may provide the parameter sets to video decoder 30 to enable video decoder 30 to decode the IRAP picture.

Figure 12:
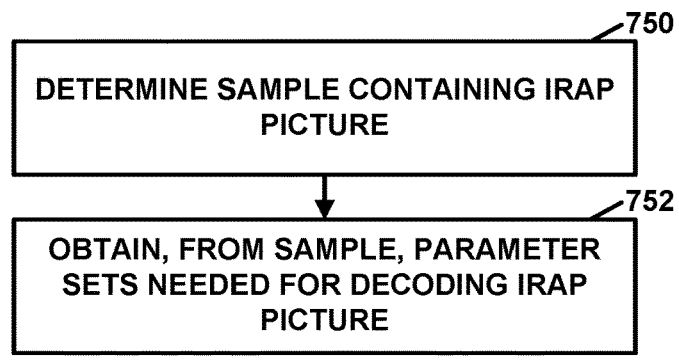
FIG. 12 is a flowchart illustrating an example operation of a device to use a parameter set stored in a sample, in accordance with a technique of this disclosure.

FIG. 12 is a flowchart illustrating an example operation of a device to use a parameter set stored in a sample, in accordance with a technique of this disclosure. As illustrated in the example of FIG. 12, a device may determine a sample containing an IRAP picture (750). Furthermore, in the example of FIG. 12, the device may then obtain, from the determined sample, parameter sets needed for decoding the IRAP picture (752). For instance, in this example, the device may determine whether video decoder 30 is configured to decode the bitstream based on PTL data specified in a VPS. In some examples, the device may provide the parameter sets to video decoder 30 to enable video decoder 30 to decode the IRAP picture.

Figure 13:
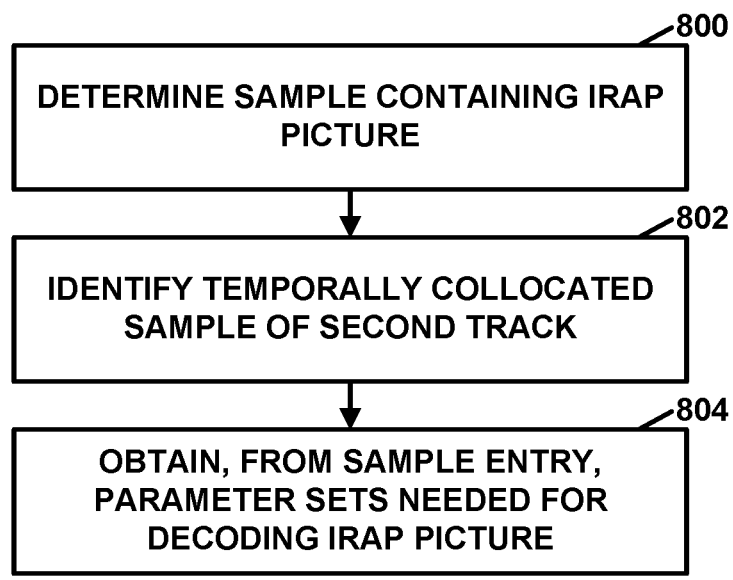
FIG. 13 is a flowchart illustrating an example operation of a device to use a parameter set stored in a sample of a track containing a reference layer, in accordance with a technique of this disclosure.

FIG. 13 is a flowchart illustrating an example operation of a device to use a parameter set stored in a sample of a track containing a reference layer, in accordance with a technique of this disclosure. In the example of FIG. 13, a device may determine a sample containing an IRAP picture (800). In this example, the sample may be in a first track of the file. Furthermore, in the example of FIG. 13, the device may identify a temporally collocated sample of a second track that carries a reference layer of the first track (802). Furthermore, in the example of FIG. 13, the device may obtain, from the identified sample, parameter sets needed for decoding the IRAP picture (804). For instance, in this example, the device may determine whether video decoder 30 is configured to decode the bitstream based on PTL data specified in a VPS. In some examples, the device may provide the parameter sets to video decoder 30 to enable video decoder 30 to decode the IRAP picture.

Example operations similar to those described with regard to FIG. 10, FIG. 11, FIG. 12, and FIG. 13 may be provided with regard to non-IRAP pictures. However, decoding typically does not start from a non-IRAP picture. Furthermore, in FIG. 12, with respect to a non-IRAP picture that belongs to a particular layer and that is in a particular sample of a particular track, the device may obtain the parameter sets needed for decoding the non-IRAP picture from any samples of the particular track that follow, in decoding time, a previous sample containing an IRAP picture in the particular track and up to the particular sample. Furthermore, in FIG. 13, with respect to a non-IRAP picture that belongs to a particular layer and that is in a particular sample of a first track, the device may identify any samples in a second track between a first sample of the second track and a second sample of the second track. The second track carries a reference layer of the first track. In this example, the first sample of the second track is a sample of the second track that is temporally collocated with a sample that is in the first track and that is the first sample previous to the particular sample that contains an IRAP picture. The second sample of the second track is temporally collocated with the particular sample of the first track.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the HEVC standard for purposes of illustration. However, the techniques described in this disclosure may be useful for other video coding processes, including other standard or proprietary video coding processes not yet developed.

Video encoder 20 (FIGS. 1 and 4) and/or video decoder 30 (FIGS. 1 and 5) may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. For example, the functions described may be performed by one or more processors, such as processing circuits. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method of processing video data, the method comprising:
   obtaining a multi-layer bitstream comprising a plurality of parameter sets, encoded representations of a plurality of Intra Random Access Picture (IRAP) pictures of the video data, and encoded representations of a plurality of non-IRAP pictures of the video data; and
   generating a file for storage of the multi-layer bitstream such that the file complies with a restriction specified in a file format to which the file conforms, wherein:
      for each respective track of a plurality of tracks of the file, media content for the respective track comprises a respective sequence of samples,
      for each respective IRAP picture of the plurality of IRAP pictures:
         the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track,
         the restriction requires that each parameter set of the plurality of parameter sets that is required for decoding the respective IRAP picture is in at least one of the following:
            a sample entry of the respective IRAP picture's track that is applicable to the respective IRAP picture's sample,
            a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample,
            the respective IRAP picture's sample, and
            any temporally collocated sample of the respective IRAP picture's sample in a track of the plurality of tracks that carries a reference layer of the respective IRAP picture's layer,
      wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and
      wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer.

2. The method of claim 1, wherein, for a particular IRAP picture of the plurality of IRAP pictures, at least one of:
   a first parameter set required for decoding the particular IRAP picture is referenced by a first set of one or more extractors present in the particular IRAP picture's sample, and
   a second parameter set required for decoding the particular IRAP picture is referenced by a second set of one or more extractors present in a temporally collocated sample of the particular IRAP picture in a track of the plurality of tracks carrying a reference layer for the particular IRAP picture's layer.

3. The method of claim 1, wherein, for each respective non-IRAP picture of the plurality of non-IRAP pictures:
the respective non-IRAP picture's layer contains the respective non-IRAP picture and is a layer of the multi-layer bitstream, the respective non-RAP picture's track contains the respective non-IRAP picture's sample, the respective non-TRAP picture's sample contains the respective non-IRAP picture, and the plurality of tracks includes the respective non-IRAP picture's track, and
the restriction further requires that each of the parameter sets that is required for decoding the respective non-IRAP picture is in at least one of the following:
a sample entry of the respective non-IRAP picture's track that is applicable to the respective non-IRAP picture's sample,
a sample entry of a non-corresponding track for the respective non-IRAP picture carrying a reference layer of the respective non-IRAP picture's layer, the non-corresponding track for the respective non-IRAP picture being a track other than the respective non-IRAP picture's track in the plurality of tracks, the sample entry of the non-corresponding track for the respective non-IRAP picture being applicable to a temporally collocated sample in the non-corresponding track for the respective non-IRAP picture or, when the temporally collocated sample in the non-corresponding track for the respective non-IRAP picture is not present, a sample in the non-corresponding track for the respective non-IRAP picture with a decoding time less than but closest to a decoding time of the respective non-IRAP picture's sample,
any sample of the respective non-IRAP picture's track following a previous IRAP picture-containing sample in the respective non-IRAP picture's layer and up to the respective non-IRAP picture's sample, inclusive, and
any sample of any track of the plurality of tracks carrying any reference layer of the respective non-IRAP picture's layer following a temporally collocated sample of the previous IRAP picture-containing sample in the respective non-IRAP picture's layer and up to a temporally collocated sample of the respective non-IRAP picture's sample, inclusive.

4. The method of claim 3, wherein, for a particular non-IRAP picture of the plurality of non-IRAP pictures, at least one of:
a first parameter set required for decoding the particular non-IRAP picture is referenced by a first set of one or more extractors present in a sample of the particular non-IRAP picture's track following a previous sample containing an IRAP picture in the particular non-IRAP picture's layer up to the particular non-IRAP picture's sample, inclusive, and
a second parameter set required for decoding the particular non-IRAP picture is referenced by a second set of one or more extractors present in a sample in a track carrying a reference layer of the particular non-IRAP picture's layer following a temporally collocated sample of the previous sample containing the IRAP picture in the particular non-IRAP picture's layer up to a temporally collocated sample of the particular non-IRAP picture's sample, inclusive.

5. The method of claim 1, the plurality of parameter sets including at least one of: a video parameter set as defined in ISO/IEC 23008-2, a sequence parameter set as defined in ISO/IEC 23008-2, and a picture parameter set as defined in ISO/IEC 23008-2.

6. A device for processing video data, the device comprising:
one or more processing circuits configured to generate a file for storage of a multi-layer bitstream such that the file complies with a restriction specified in a file format to which the file conforms, wherein:
the multi-layer bitstream comprises a plurality of parameter sets, encoded representations of a plurality of Intra Random Access Picture (IRAP) pictures of the video data, and encoded representations of a plurality of non-IRAP pictures of the video data,
for each respective track of a plurality of tracks of the file, media content for the respective track comprises a respective sequence of samples, wherein a relevant sample entry for a sample of the respective track is a sample entry of the respective track that is applicable to the sample,
for each respective IRAP picture of the plurality of IRAP pictures:
the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track,
the restriction requires that each parameter set of the plurality of parameter sets that is required for decoding the respective TRAP picture is in at least one of the following:
a sample entry of the respective TRAP picture's track that is applicable to the respective IRAP picture's sample,
a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample,
the respective IRAP picture's sample, and
any temporally collocated sample of the respective IRAP picture's sample in a track of the plurality of tracks that carries a reference layer of the respective IRAP picture's layer,
wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer; and a data storage medium coupled to the one or more processing circuits, the data storage medium configured to store the file.

7. The device of claim 6, wherein, for a particular IRAP picture of the plurality of IRAP pictures, at least one of:

a first parameter set required for decoding the particular IRAP picture is referenced by a first set of one or more extractors present in the particular IRAP picture's sample, and a second parameter set required for decoding the particular IRAP picture is referenced by a second set of one or more extractors present in a temporally collocated sample of the particular IRAP picture in a track of the plurality of tracks carrying a reference layer for the particular IRAP picture's layer.

8. The device of claim 6, wherein, for each respective non-IRAP picture of the plurality of non-IRAP pictures:

the respective non-IRAP picture's layer contains the respective non-IRAP picture and is a layer of the multi-layer bitstream, the respective non-RAP picture's track contains the respective non-RAP picture's sample, the respective non-IRAP picture's sample contains the respective non-RAP picture, and the plurality of tracks includes the respective non-IRAP picture's track, and the restriction further requires that each of the parameter sets that is required for decoding the respective non-IRAP picture is in at least one of the following:

a sample entry of the respective non-IRAP picture's track that is applicable to the respective non-IRAP picture's sample, a sample entry of a non-corresponding track for the respective non-IRAP picture carrying a reference layer of the respective non-IRAP picture's layer, the non-corresponding track for the respective non-IRAP picture being a track other than the respective non-IRAP picture's track in the plurality of tracks, the sample entry of the non-corresponding track for the respective non-RAP picture being applicable to a temporally collocated sample in the non-corresponding track for the respective non-IRAP picture or, when the temporally collocated sample in the non-corresponding track for the respective non-IRAP picture is not present, a sample in the non-corresponding track for the respective non-IRAP picture with a decoding time less than but closest to a decoding time of the respective non-IRAP picture's sample, any sample of the respective non-TRAP picture's track following a previous TRAP picture-containing sample in the respective non-IRAP picture's layer and up to the respective non-IRAP picture's sample, inclusive, and any sample of any track of the plurality of tracks carrying any reference layer of the respective non-IRAP picture's layer following a temporally collocated sample of the previous IRAP picture-containing sample in the respective non-IRAP picture's layer and up to a temporally collocated sample of the respective non-IRAP picture's sample, inclusive.

9. The device of claim 8, wherein, for a particular non-IRAP picture of the plurality of non-IRAP pictures, at least one of:

a first parameter set required for decoding the particular non-IRAP picture is referenced by a first set of one or more extractors present in a sample of the particular non-IRAP picture's track following a previous sample containing an IRAP picture in the particular non-IRAP picture's layer up to the particular non-IRAP picture's sample, inclusive, and a second parameter set required for decoding the particular non-IRAP picture is referenced by a second set of one or more extractors present in a sample in a track carrying a reference layer of the particular non-IRAP picture's layer following a temporally collocated sample of the previous sample containing the IRAP picture in the particular non-IRAP picture's layer up to a temporally collocated sample of the particular non-IRAP picture's sample, inclusive.

10. The device of claim 8, the plurality of parameter sets including at least one of: a video parameter set as defined in ISO/IEC 23008-2, a sequence parameter set as defined in ISO/IEC 23008-2, and a picture parameter set as defined in ISO/IEC 23008-2.

11. A method of processing video data, the method comprising:

storing a file that stores a multi-layer bitstream, the file complying with a restriction specified in a file format to which the file conforms, wherein:

the multi-layer bitstream comprises a plurality of parameter sets, encoded representations of a plurality of Intra Random Access Picture (IRAP) pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures:

the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following:

a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer, wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer; and streaming at least a portion of the file to a receiving device.

12. The method of claim 11, wherein the plurality of tracks includes a particular track, the method further comprising:

determining a sample that is in the particular track and that contains a particular IRAP picture;

identifying a sample entry that is applicable to the determined sample;

obtaining, from the identified sample entry, a parameter set needed for decoding the particular IRAP picture; and determining, based on the parameter set, whether the receiving device is configured to decode the multi-layer bitstream starting from the particular IRAP picture.

13. The method of claim 11, wherein the plurality of tracks includes a first track and a second track, the second track carrying a reference layer for a layer carried in the first track, the method further comprising:

determining a sample that is in the first track and that contains a particular IRAP picture;

identifying a sample entry of the second track, wherein at least one of:

the identified sample entry is applicable to a sample of the second track that is temporally collocated with the determined sample of the first track, or when no sample of the second track is temporally collocated with the determined sample of the first track, the identified sample entry is applicable to a sample in the second track with a decoding time less than but closest to a decoding time of the determined sample of the first track;

obtaining, from the identified sample entry, a parameter set needed for decoding the particular TRAP picture; and determining, based on the parameter set, whether the receiving device is configured to decode the multi-layer bitstream starting from the TRAP picture.

14. The method of claim 11, further comprising:

determining a sample containing an IRAP picture;

obtaining, from the determined sample, a parameter set needed for decoding the IRAP picture; and determining, based on the parameter sets, whether the receiving device is configured to decode the bitstream starting from the IRAP picture.

15. The method of claim 11, wherein the plurality of tracks includes a first track and a second track, the second track carrying a reference layer of a layer carried in the first track, the method further comprising:

determining a sample containing an IRAP picture, the sample being in the first track, identifying a temporally collocated sample of the second track;

obtaining, from the identified sample, a parameter set needed for decoding the IRAP picture; and determining, based on the parameter sets, whether the receiving device is configured to decode the bitstream starting from the IRAP picture.

16. The method of claim 11, wherein, for a particular IRAP picture of the plurality of IRAP pictures, at least one of:

a first parameter set required for decoding the particular IRAP picture is referenced by a first set of one or more extractors present in the particular IRAP picture's sample, and a second parameter set required for decoding the particular IRAP picture is referenced by a second set of one or more extractors present in a temporally collocated sample of the particular IRAP picture in a track of the plurality of tracks carrying a reference layer for the particular IRAP picture's layer.

17. The method of claim 11, wherein, for each respective non-IRAP picture of the plurality of non-IRAP pictures:

the respective non-IRAP picture's layer contains the respective non-IRAP picture and is a layer of the multi-layer bitstream, the respective non-IRAP picture's track contains the respective non-IRAP picture's sample, the respective non-IRAP picture's sample contains the respective non-IRAP picture, and the plurality of tracks includes the respective non-IRAP picture's track, and the restriction further requires that each of the parameter sets that is required for decoding the respective non-IRAP picture is in at least one of the following:

a sample entry of the respective non-IRAP picture's track that is applicable to the respective non-IRAP picture's sample, a sample entry of a non-corresponding track for the respective non-IRAP picture carrying a reference layer of the respective non-IRAP picture's layer, the non-corresponding track for the respective non-IRAP picture being a track other than the respective non-IRAP picture's track in the plurality of tracks, the sample entry of the non-corresponding track for the respective non-IRAP picture being applicable to a temporally collocated sample in the non-corresponding track for the respective non-IRAP picture or, when the temporally collocated sample in the non-corresponding track for the respective non-IRAP picture is not present, a sample in the non-corresponding track for the respective non-IRAP picture with a decoding time less than but closest to a decoding time of the respective non-IRAP picture's sample, any sample of the respective non-IRAP picture's track following a previous IRAP picture-containing sample in the respective non-IRAP picture's layer and up to the respective non-IRAP picture's sample, inclusive, and any sample of any track of the plurality of tracks carrying any reference layer of the respective non-IRAP picture's layer following a temporally collocated sample of the previous IRAP picture-containing sample in the respective non-IRAP picture's layer and up to a temporally collocated sample of the respective non-IRAP picture's sample, inclusive.

18. The method of claim 17, wherein, for a particular non-IRAP picture of the plurality of non-IRAP pictures, at least one of:

a first parameter set required for decoding the particular non-IRAP picture is referenced by a first set of one or more extractors present in a sample of the particular non-IRAP picture's track following a previous sample containing an IRAP picture in the particular non-IRAP picture's layer up to the particular non-IRAP picture's sample, inclusive, and a second parameter set required for decoding the particular non-IRAP picture is referenced by a second set of one or more extractors present in a sample in a track carrying a reference layer of the particular non-IRAP picture's layer following a temporally collocated sample of the previous sample containing the IRAP picture in the particular non-IRAP picture's layer up to a temporally collocated sample of the particular non-IRAP picture's sample, inclusive.

19. The method of claim 11, the plurality of parameter sets including at least one of: a video parameter set as defined in ISO/IEC 23008-2, a sequence parameter set as defined in ISO/IEC 23008-2, and a picture parameter set as defined in ISO/IEC 23008-2.

20. A device for processing video data, the device comprising:

a data storage medium configured to store a file that stores a multi-layer bitstream, the file complying with a restriction specified in a file format to which the file conforms, wherein:

the multi-layer bitstream comprises a plurality of parameter sets, encoded representations of a plurality of Intra Random Access Picture (IRAP) pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures:

the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following:

a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer, wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer; and an interface configured to stream at least a portion of the file to a receiving device.

21. The device of claim 20, wherein the plurality of tracks includes a particular track, the device comprises one or more processing circuits configured to:

determine a sample that is in the particular track and that contains a particular IRAP picture;

identify a sample entry that is applicable to the determined sample;

obtain, from the identified sample entry, a parameter set needed for decoding the particular TRAP picture; and determine, based on the parameter set, whether the receiving device is configured to decode the multi-layer bitstream starting from the TRAP picture.

22. The device of claim 20, wherein the plurality of tracks includes a first track and a second track, the second track carrying a reference layer for a layer carried in the first track, the device comprises one or more processing circuits configured to:

determine a sample that is in the first track and that contains a particular TRAP picture;

identify a sample entry of the second track, wherein at least one of:

the identified sample entry is applicable to a sample of the second track that is temporally collocated with the determined sample of the first track, or when no sample of the second track is temporally collocated with the determined sample of the first track, the identified sample entry is applicable to a sample in the second track with a decoding time less than but closest to a decoding time of the determined sample of the first track;

obtain, from the identified sample entry, a parameter set needed for decoding the particular TRAP picture; and determine, based on the parameter set, whether the receiving device is configured to decode the multi-layer bitstream starting from the particular TRAP picture.

23. The device of claim 20, further comprising one or more processing circuits configured to:

determine a sample containing an IRAP picture;

obtain, from the determined sample, a parameter set needed for decoding the IRAP picture; and determine, based on the parameter sets, whether the receiving device is configured to is configured to decode the bitstream starting from the TRAP picture.

24. The device of claim 20, wherein the plurality of tracks includes a first track and a second track, the second track carrying a reference layer of a layer carried in the first track, the device comprises one or more processing circuits configured to:

determine a sample containing an IRAP picture, the sample being in the first track, identify a temporally collocated sample of the second track;

obtain, from the identified sample, a parameter set needed for decoding the IRAP picture; and determine, based on the parameter sets, whether the receiving device is configured to decode the bitstream starting from the IRAP picture.

25. The device of claim 20, wherein, for a particular IRAP picture of the plurality of IRAP pictures, at least one of:

a first parameter set required for decoding the particular IRAP picture is referenced by a first set of one or more extractors present in the particular IRAP picture's sample, and a second parameter set required for decoding the particular IRAP picture is referenced by a second set of one or more extractors present in a temporally collocated sample of the particular IRAP picture in a track of the plurality of tracks carrying a reference layer for the particular IRAP picture's layer.

26. The device of claim 20, wherein, for each respective non-IRAP picture of the plurality of non-IRAP pictures:

the respective non-IRAP picture's layer contains the respective non-IRAP picture and is a layer of the multi-layer bitstream, the respective non-RAP picture's track contains the respective non-RAP picture's sample, the respective non-IRAP picture's sample contains the respective non-RAP picture, and the plurality of tracks includes the respective non-IRAP picture's track, and the restriction further requires that each of the parameter sets that is required for decoding the respective non-TRAP picture is in at least one of the following:

a sample entry of the respective non-TRAP picture's track that is applicable to the respective non-IRAP picture's sample, a sample entry of a non-corresponding track for the respective non-IRAP picture carrying a reference layer of the respective non-IRAP picture's layer, the non-corresponding track for the respective non-IRAP picture being a track other than the respective non-IRAP picture's track in the plurality of tracks, the sample entry of the non-corresponding track for the respective non-IRAP picture being applicable to a temporally collocated sample in the non-corresponding track for the respective non-IRAP picture or, when the temporally collocated sample in the non-corresponding track for the respective non-IRAP picture is not present, a sample in the non-corresponding track for the respective non-IRAP picture with a decoding time less than but closest to a decoding time of the respective non-IRAP picture's sample, any sample of the respective non-IRAP picture's track following a previous IRAP picture-containing sample in the respective non-IRAP picture's layer and up to the respective non-IRAP picture's sample, inclusive, and any sample of any track of the plurality of tracks carrying any reference layer of the respective non-IRAP picture's layer following a temporally collocated sample of the previous IRAP picture-containing sample in the respective non-IRAP picture's layer and up to a temporally collocated sample of the respective non-IRAP picture's sample, inclusive.

27. The device of claim 26, wherein, for a particular non-IRAP picture of the plurality of non-IRAP pictures, at least one of:

a first parameter set required for decoding the particular non-IRAP picture is referenced by a first set of one or more extractors present in a sample of the particular non-IRAP picture's track following a previous sample containing an IRAP picture in the particular non-IRAP picture's layer up to the particular non-IRAP picture's sample, inclusive, and a second parameter set required for decoding the particular non-IRAP picture is referenced by a second set of one or more extractors present in a sample in a track carrying a reference layer of the particular non-IRAP picture's layer following a temporally collocated sample of the previous sample containing the IRAP picture in the particular non-IRAP picture's layer up to a temporally collocated sample of the particular non-IRAP picture's sample, inclusive.

28. The device of claim 20, the plurality of parameter sets including at least one of: a video parameter set as defined in ISO/IEC 23008-2, a sequence parameter set as defined in ISO/IEC 23008-2, and a picture parameter set as defined in ISO/IEC 23008-2.

29. A method of processing video data, the method comprising:

obtaining a file storing a multi-layer bitstream, the file complying with a restriction specified in a file format to which the file conforms, wherein:

the multi-layer bitstream comprises a plurality of parameter sets, encoded representations of a plurality of Intra Random Access Picture (IRAP) pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures:

the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following:
 a sample entry of the respective IRAP picture's track that is applicable to the respective IRAP picture's sample,
 a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample,
 the respective IRAP picture's sample, and
 any temporally collocated sample of the respective IRAP picture's sample in a track of the plurality of tracks that carries a reference layer of the respective IRAP picture's layer,
 wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and
 wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer; and
decoding at least a portion of the multi-layer bitstream in the file.

30. The method of claim 29, wherein obtaining the file comprises progressively downloading the file.

31. The method of claim 29, wherein the plurality of tracks includes a particular track, the method further comprising:
 determining a sample that is in the particular track and that contains a particular IRAP picture;
 identifying a sample entry that is applicable to the determined sample;
 obtaining, from the identified sample entry, a parameter set needed for decoding the particular TRAP picture; and
 determining, based on the parameter set, whether to decode the multi-layer bitstream starting from the TRAP picture.

32. The method of claim 29, wherein the plurality of tracks includes a first track and a second track, the second track carrying a reference layer for a layer carried in the first track, the method further comprising:
 determining a sample that is in the first track and that contains a particular TRAP picture;
 identifying a sample entry of the second track, wherein at least one of:
  the identified sample entry is applicable to a sample of the second track that is temporally collocated with the determined sample of the first track, or
  when no sample of the second track is temporally collocated with the determined sample of the first track, the identified sample entry is applicable to a sample in the second track with a decoding time less than but closest to a decoding time of the determined sample of the first track;
 obtaining, from the identified sample entry, a parameter set needed for decoding the particular TRAP picture; and
 determining, based on the parameter set, whether to decode the multi-layer bitstream starting from the particular TRAP picture.

33. The method of claim 29, further comprising:
 determining a sample containing an IRAP picture;
 obtaining, from the determined sample, a parameter set needed for decoding the IRAP picture; and
 determining, based on the parameter sets, whether to decode the bitstream starting from the IRAP picture.

34. The method of claim 29, wherein the plurality of tracks includes a first track and a second track, the second track carrying a reference layer of a layer carried in the first track, the method further comprising:
 determining a sample containing an IRAP picture, the sample being in the first track,
 identifying a temporally collocated sample of the second track;
 obtaining, from the identified sample, a parameter set needed for decoding the IRAP picture; and
 determining, based on the parameter sets, whether to decode the bitstream starting from the IRAP picture.

35. The method of claim 29, wherein, for a particular IRAP picture of the plurality of IRAP pictures, at least one of:
 a first parameter set required for decoding the particular IRAP picture is referenced by a first set of one or more extractors present in the particular IRAP picture's sample, and
 a second parameter set required for decoding the particular IRAP picture is referenced by a second set of one or more extractors present in a temporally collocated sample of the particular IRAP picture in a track of the plurality of tracks carrying a reference layer for the particular IRAP picture's layer.

36. The method of claim 29, wherein, for each respective non-IRAP picture of the plurality of non-IRAP pictures:
 the respective non-IRAP picture's layer contains the respective non-IRAP picture and is a layer of the multi-layer bitstream, the respective non-RAP picture's track contains the respective non-RAP picture's sample, the respective non-IRAP picture's sample contains the respective non-RAP picture, and the plurality of tracks includes the respective non-IRAP picture's track, and
 the restriction further requires that each of the parameter sets that is required for decoding the respective non-IRAP picture is in at least one of the following:
  a sample entry of the respective non-IRAP picture's track that is applicable to the respective non-IRAP picture's sample,
  a sample entry of a non-corresponding track for the respective non-IRAP picture carrying a reference layer of the respective non-IRAP picture's layer, the non-corresponding track for the respective non-IRAP picture being a track other than the respective non-IRAP picture's track in the plurality of tracks, the sample entry of the non-corresponding track for the respective non-IRAP picture being applicable to a temporally collocated sample in the non-corresponding track for the respective non-IRAP picture or, when the temporally collocated sample in the non-corresponding track for the respective non-IRAP picture is not present, a sample in the non-corresponding track for the respective non-IRAP picture with a decoding time less than but closest to a decoding time of the respective non-IRAP picture's sample, any sample of the respective non-IRAP picture's track following a previous IRAP picture-containing sample in the respective non-IRAP picture's layer and up to the respective non-IRAP picture's sample, inclusive, and any sample of any track of the plurality of tracks carrying any reference layer of the respective non-IRAP picture's layer following a temporally collocated sample of the previous IRAP picture-containing sample in the respective non-IRAP picture's layer and up to a temporally collocated sample of the respective non-IRAP picture's sample, inclusive.

37. The method of claim 36, wherein, for a particular non-IRAP picture of the plurality of non-IRAP pictures, at least one of:

a first parameter set required for decoding the particular non-IRAP picture is referenced by a first set of one or more extractors present in a sample of the particular non-IRAP picture's track following a previous sample containing an IRAP picture in the particular non-IRAP picture's layer up to the particular non-IRAP picture's sample, inclusive, and a second parameter set required for decoding the particular non-IRAP picture is referenced by a second set of one or more extractors present in a sample in a track carrying a reference layer of the particular non-IRAP picture's layer following a temporally collocated sample of the previous sample containing the IRAP picture in the particular non-IRAP picture's layer up to a temporally collocated sample of the particular non-IRAP picture's sample, inclusive.

38. The method of claim 29, the plurality of parameter sets including at least one of: a video parameter set as defined in ISO/IEC 23008-2, a sequence parameter set as defined in ISO/IEC 23008-2, and a picture parameter set as defined in ISO/IEC 23008-2.

39. A device for processing video data, the device comprising:

an input interface configured to obtain a file storing a multi-layer bitstream, the file complying with a restriction specified in a file format to which the file conforms, wherein:

the multi-layer bitstream comprises a plurality of parameter sets, encoded representations of a plurality of Intra Random Access Picture (IRAP) pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures:

the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following:

a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective TRAP picture with a decoding time less than but closest to a decoding time of the respective IRAP picture's sample, the respective TRAP picture's sample, and any temporally collocated sample of the respective IRAP picture's sample in a track of the plurality of tracks that carries a reference layer of the respective IRAP picture's layer, wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer; and one or more processing circuits coupled to the input interface, the one or more processing circuits configured to decode at least a portion of the multi-layer bitstream in the file.

40. The device of claim 39, wherein the input interface is configured such that, as part of obtaining the file, the input interface progressively downloads the file.

41. The device of claim 39, wherein the plurality of tracks includes a particular track, the one or more processing circuits configured to:

determine a sample that is in the particular track and that contains a particular IRAP picture;

identify a sample entry that is applicable to the determined sample;

obtain, from the identified sample entry, a parameter set needed for decoding the particular IRAP picture; and determine, based on the parameter set, whether to decode the multi-layer bitstream starting from the IRAP picture.

42. The device of claim 39, wherein the plurality of tracks includes a first track and a second track, the second track carrying a reference layer for a layer carried in the first track, the device comprises one or more processing circuits configured to:
    determine a sample that is in the first track and that contains a particular TRAP picture;
    identify a sample entry of the second track, wherein at least one of:
        the identified sample entry is applicable to a sample of the second track that is temporally collocated with the determined sample of the first track, or
        when no sample of the second track is temporally collocated with the determined sample of the first track, the identified sample entry is applicable to a sample in the second track with a decoding time less than but closest to a decoding time of the determined sample of the first track;
    obtain, from the identified sample entry, a parameter set needed for decoding the particular TRAP picture; and
    determine, based on the parameter set, whether to decode the multi-layer bitstream starting from the particular TRAP picture.

43. The device of claim 39, wherein the one or more processing circuits are configured to:
    determine a sample containing an IRAP picture;
    obtain, from the determined sample, a parameter set needed for decoding the IRAP picture; and
    determine, based on the parameter sets, whether to decode the bitstream starting from the IRAP picture.

44. The device of claim 39, wherein the plurality of tracks includes a first track and a second track, the second track carrying a reference layer of a layer carried in the first track, the one or more processing circuits configured to:
    determine a sample containing an IRAP picture, the sample being in the first track,
    identify a temporally collocated sample of the second track;
    obtain, from the identified sample, a parameter set needed for decoding the IRAP picture; and
    determine, based on the parameter sets, whether to decode the bitstream starting from the IRAP picture.

45. The device of claim 39, wherein, for a particular IRAP picture of the plurality of IRAP pictures, at least one of:
    a first parameter set required for decoding the particular IRAP picture is referenced by a first set of one or more extractors present in the particular IRAP picture's sample, and
    a second parameter set required for decoding the particular IRAP picture is referenced by a second set of one or more extractors present in a temporally collocated sample of the particular IRAP picture in a track of the plurality of tracks carrying a reference layer for the particular IRAP picture's layer.

46. The device of claim 39, wherein, for each respective non-IRAP picture of the plurality of non-IRAP pictures:
    the respective non-IRAP picture's layer contains the respective non-IRAP picture and is a layer of the multi-layer bitstream, the respective non-RAP picture's track contains the respective non-RAP picture's sample, the respective non-IRAP picture's sample contains the respective non-RAP picture, and the plurality of tracks includes the respective non-IRAP picture's track, and
    the restriction further requires that each of the parameter sets that is required for decoding the respective non-IRAP picture is in at least one of the following:
        a sample entry of the respective non-IRAP picture's track that is applicable to the respective non-IRAP picture's sample,
        a sample entry of a non-corresponding track for the respective non-IRAP picture carrying a reference layer of the respective non-IRAP picture's layer, the non-corresponding track for the respective non-IRAP picture being a track other than the respective non-IRAP picture's track in the plurality of tracks, the sample entry of the non-corresponding track for the respective non-RAP picture being applicable to a temporally collocated sample in the non-corresponding track for the respective non-IRAP picture or, when the temporally collocated sample in the non-corresponding track for the respective non-IRAP picture is not present, a sample in the non-corresponding track for the respective non-TRAP picture with a decoding time less than but closest to a decoding time of the respective non-TRAP picture's sample,
        any sample of the respective non-TRAP picture's track following a previous TRAP picture-containing sample in the respective non-IRAP picture's layer and up to the respective non-IRAP picture's sample, inclusive, and
        any sample of any track of the plurality of tracks carrying any reference layer of the respective non-IRAP picture's layer following a temporally collocated sample of the previous IRAP picture-containing sample in the respective non-IRAP picture's layer and up to a temporally collocated sample of the respective non-IRAP picture's sample, inclusive.

47. The device of claim 46, wherein, for a particular non-IRAP picture of the plurality of non-IRAP pictures, at least one of:
    a first parameter set required for decoding the particular non-IRAP picture is referenced by a first set of one or more extractors present in a sample of the particular non-IRAP picture's track following a previous sample containing an IRAP picture in the particular non-IRAP picture's layer up to the particular non-IRAP picture's sample, inclusive, and
    a second parameter set required for decoding the particular non-IRAP picture is referenced by a second set of one or more extractors present in a sample in a track carrying a reference layer of the particular non-IRAP picture's layer following a temporally collocated sample of the previous sample containing the IRAP picture in the particular non-IRAP picture's layer up to a temporally collocated sample of the particular non-IRAP picture's sample, inclusive.

48. The device of claim 39, the plurality of parameter sets including at least one of: a video parameter set as defined in ISO/IEC 23008-2, a sequence parameter set as defined in ISO/IEC 23008-2, and a picture parameter set as defined in ISO/IEC 23008-2.

49. A device for processing video data, the device comprising:
    means for obtaining a multi-layer bitstream comprising a plurality of parameter sets, encoded representations of a plurality of Intra Random Access Picture (IRAP) pictures of the video data, and encoded representations of a plurality of non-IRAP pictures of the video data; and means for generating a file for storage of the multi-layer bitstream such that the file complies with a restriction specified in a file format to which the file conforms, wherein:
  for each respective track of a plurality of tracks of the file, media content for the respective track comprises a respective sequence of samples,
  for each respective IRAP picture of the plurality of IRAP pictures:
    the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track,
    the restriction requires that each parameter set of the plurality of parameter sets that is required for decoding the respective IRAP picture is in at least one of the following:
      a sample entry of the respective IRAP picture's track that is applicable to the respective IRAP picture's sample,
      a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample,
      the respective IRAP picture's sample, and
      any temporally collocated sample of the respective IRAP picture's sample in a track of the plurality of tracks that carries a reference layer of the respective IRAP picture's layer,
  wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and
  wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer.

50. A non-transitory computer-readable storage medium comprising instructions that, when executed, cause a device to:
  obtain a multi-layer bitstream comprising a plurality of parameter sets, encoded representations of a plurality of Intra Random Access Picture (IRAP) pictures of the video data, and encoded representations of a plurality of non-IRAP pictures of the video data; and
  generate a file for storage of the multi-layer bitstream such that the file complies with a restriction specified in a file format to which the file conforms, wherein:
    for each respective track of a plurality of tracks of the file, media content for the respective track comprises a respective sequence of samples,
    for each respective IRAP picture of the plurality of IRAP pictures:
      the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track,
      the restriction requires that each parameter set of the plurality of parameter sets that is required for decoding the respective IRAP picture is in at least one of the following:
        a sample entry of the respective TRAP picture's track that is applicable to the respective IRAP picture's sample,
        a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample,
        the respective IRAP picture's sample, and
        any temporally collocated sample of the respective IRAP picture's sample in a track of the plurality of tracks that carries a reference layer of the respective IRAP picture's layer,
    wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and
    wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer.

51. A device for processing video data, the device comprising:
  means for storing a file that stores a multi-layer bitstream, the file complying with a restriction specified in a file format to which the file conforms, wherein:
    the multi-layer bitstream comprises a plurality of parameter sets, encoded representations of a plurality of Intra Random Access Picture (IRAP) pictures of the video data, and encoded representations of a plurality of non-IRAP pictures of the video data,
    for each respective track of a plurality of tracks of the file, media content for the respective track comprises a respective sequence of samples,
    for each respective IRAP picture of the plurality of IRAP pictures:

the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following:

a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer, wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer; and means for streaming at least a portion the file to a receiving device.

52. A non-transitory computer-readable storage medium configured to store instructions that, when executed, cause a device to:

store a file that stores a multi-layer bitstream, the file complying with a restriction specified in a file format to which the file conforms, wherein:

the multi-layer bitstream comprises a plurality of parameter sets, encoded representations of a plurality of Intra Random Access Picture (IRAP) pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures:

the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track, the restriction requires that each parameter set of the plurality of parameter sets that is required for decoding the respective IRAP picture is in at least one of the following:

a sample entry of the respective IRAP picture's track that is applicable to the respective IRAP picture's sample, a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample, the respective IRAP picture's sample, and any temporally collocated sample of the respective IRAP picture's sample in a track of the plurality of tracks that carries a reference layer of the respective IRAP picture's layer, wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer; and stream at least a portion of the file to a receiving device.

53. A device for processing video data, the device comprising:

means for obtaining a file storing a multi-layer bitstream, the file complying with a restriction specified in a file format to which the file conforms, wherein:

the multi-layer bitstream comprises a plurality of parameter sets, encoded representations of a plurality of Intra Random Access Picture (IRAP) pictures of the video data, and encoded representations of a plurality of non-IRAP pictures of the video data, for each respective track of a plurality of tracks of the file, media content for the respective track comprises a respective sequence of samples, for each respective IRAP picture of the plurality of IRAP pictures:
the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track,
the restriction requires that each parameter set of the plurality of parameter sets that is required for decoding the respective IRAP picture is in at least one of the following:
a sample entry of the respective IRAP picture's track that is applicable to the respective IRAP picture's sample,
a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample,
the respective IRAP picture's sample, and
any temporally collocated sample of the respective IRAP picture's sample in a track of the plurality of tracks that carries a reference layer of the respective IRAP picture's layer,
wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and
wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer; and
means for decoding at least a portion of the multi-layer bitstream in the file.

54. A non-transitory computer-readable storage medium having stored thereon instruction that, when executed, cause a device to:
obtain a file storing a multi-layer bitstream, the file complying with a restriction specified in a file format to which the file conforms, wherein:
the multi-layer bitstream comprises a plurality of parameter sets, encoded representations of a plurality of Intra Random Access Picture (IRAP) pictures of the video data, and encoded representations of a plurality of non-IRAP pictures of the video data,
for each respective track of a plurality of tracks of the file, media content for the respective track comprises a respective sequence of samples,
for each respective IRAP picture of the plurality of IRAP pictures:
the respective IRAP picture's layer contains the respective IRAP picture and is a layer of the multi-layer bitstream, the respective IRAP picture's track contains the respective IRAP picture's sample, the respective IRAP picture's sample contains the respective IRAP picture, and the plurality of tracks includes the respective IRAP picture's track,
the restriction requires that each parameter set of the plurality of parameter sets that is required for decoding the respective IRAP picture is in at least one of the following:
a sample entry of the respective IRAP picture's track that is applicable to the respective IRAP picture's sample,
a sample entry of a non-corresponding track for the respective IRAP picture carrying a reference layer of the respective IRAP picture's layer, the non-corresponding track for the respective IRAP picture being a track other than the respective IRAP picture's track in the plurality of tracks, the sample entry of the non-corresponding track for the respective IRAP picture being applicable to a temporally collocated sample in the non-corresponding track for the respective IRAP picture or, when the temporally collocated sample in the non-corresponding track for the respective IRAP picture is not present, a sample in the non-corresponding track for the respective IRAP picture with a decoding time less than but closest to a decoding time of the respective IRAP picture's sample,
the respective IRAP picture's sample, and
any temporally collocated sample of the respective IRAP picture's sample in a track of the plurality of tracks that carries a reference layer of the respective IRAP picture's layer,
wherein for a first IRAP picture of the plurality of IRAP pictures, each parameter set that is required for decoding the first IRAP picture is in a sample entry of a non-corresponding track for the first IRAP picture carrying a reference layer of the first IRAP picture's layer, and
wherein for a second IRAP picture of the plurality of IRAP pictures, each parameter set that is required for decoding the second IRAP picture is in a temporally collocated sample of the second IRAP picture's sample in a track of the plurality of tracks that carries a reference layer of the second IRAP picture's layer; and
decode at least a portion of the multi-layer bitstream in the file.

\* \* \* \* \*